(12) United States Patent
Tanaka et al.

(10) Patent No.: US 8,881,908 B2
(45) Date of Patent: Nov. 11, 2014

(54) METHOD FOR SIMPLY SEPARATING CARBON NANOTUBE

(71) Applicant: National Institute of Advanced Industrial Science and Technology, Tokyo (JP)

(72) Inventors: Takeshi Tanaka, Ibaraki (JP); Hiromichi Kataura, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 215 days.

(21) Appl. No.: 13/689,975

(22) Filed: Nov. 30, 2012

(65) Prior Publication Data

US 2013/0112597 A1 May 9, 2013

Related U.S. Application Data

(62) Division of application No. 12/747,298, filed as application No. PCT/JP2008/072414 on Dec. 10, 2008, now Pat. No. 8,404,207.

(30) Foreign Application Priority Data

Dec. 10, 2007 (JP) .................................. 2007-318302
Aug. 26, 2008 (JP) .................................. 2008-216087

(51) Int. Cl.
| | |
|---|---|
| B03B 1/00 | (2006.01) |
| B82Y 40/00 | (2011.01) |
| D01F 9/12 | (2006.01) |
| B01D 17/00 | (2006.01) |
| B82Y 30/00 | (2011.01) |
| C01B 31/02 | (2006.01) |

(52) U.S. Cl.
CPC . *B03B 1/00* (2013.01); *B82Y 30/00* (2013.01); *C01B 31/0233* (2013.01); *C01B 31/0266* (2013.01); *C01B 31/0273* (2013.01); *B82Y 40/00* (2013.01); *C01B 2202/22* (2013.01); *C01B 2202/28* (2013.01); *Y10S 977/845* (2013.01)

USPC .............. 209/2; 494/37; 977/845; 423/447.1; 423/461

(58) Field of Classification Search
CPC .... B82Y 30/00; B82Y 40/00; C01B 31/0233; C01B 31/0266; C01B 31/0273; C01B 2202/22; C01B 2202/28; B03B 1/00; Y10S 977/845
USPC ........ 423/447.1–447.3, 445 B; 977/742–754, 977/842–848
See application file for complete search history.

(56) References Cited

U.S. PATENT DOCUMENTS

| | | |
|---|---|---|
| 2008/0308772 A1 | 12/2008 | Akasaka et al. |
| 2010/0111814 A1* | 5/2010 | Doorn et al. ............... 423/447.1 |

FOREIGN PATENT DOCUMENTS

| | | |
|---|---|---|
| JP | 2005-95806 | 4/2005 |
| JP | 2007-8745 | 1/2007 |
| WO | 2006/013788 | 2/2006 |

OTHER PUBLICATIONS

Liu, et al., Recent Developments in Carbon Nanotube Sorting and Selective Growth, MRS Bulletin 2010; 35: 315-321.*

(Continued)

*Primary Examiner* — Daniel C McCracken
(74) *Attorney, Agent, or Firm* — Wenderoth, Lind & Ponack, L.L.P.

(57) ABSTRACT

Disclosed are a method and an apparatus for separating metallic CNT and semiconducting CNT, comprising treating with a physical separation means of centrifugation, freezing-thawing-squeezing, diffusion, permeation or the like using a gel containing CNT as a dispersed and isolated state (CNT-containing gel), to thereby make semiconducting CNT exist in gel and make metallic CNT exist in solution.

20 Claims, 22 Drawing Sheets

(56) References Cited

OTHER PUBLICATIONS

International Search Report issued Feb. 17, 2009 in International (PCT) Application No. PCT/JP2008/072414.
Tanaka, et al., "High-Yield Separation of Metallic and Semiconducting Single-Wall Carbon Nanotubes by Agarose Gel Electrophoresis", Applied Physics Express, 2008, 1, pp. 114001-1 to 114001-3.
Tanaka, et al., "Simple and Scalable Gel-Based Separation of Metallic and Semiconducting Carbon Nanotubes", Nano Letters, 2009, 9(4), pp. 1497-1500.
Definition of "ampholytic", accessed online at http://dictionary.reference.com/browse/ampholytic on Jul. 17, 2012.
Liu, et al., "Recent Developments in Carbon Nanotube Sorting and Selective Growth", MRS Bulletin, 2010, 35, pp. 315-321.

* cited by examiner

S1~3 : Absorption by Semiconducting CNT
M1    : Absorption by Metallic CNT

S1~3 : Absorption by Semiconducting CNT
M1    : Absorption by Metallic CNT

S1~3 : Absorption by Semiconducting CNT
M1 : Absorption by Metallic CNT

S1~3 : Absorption by Semiconducting CNT
M1 : Absorption by Metallic CNT
* : Absorption by Water S1,S2 : Absorption by Semiconducting CNT
M1     : Absorption by Metallic CNT S1,S2 : Absorption by Semiconducting CNT
M1   : Absorption by Metallic CNT S2,S3 : Absorption by Semiconducting CNT
M1 : Absorption by Metallic CNT S2,S3 : Absorption by Semiconducting CNT
M1    : Absorption by Metallic CNT S2,S3 : Absorption by Semiconducting CNT
M1    : Absorption by Metallic CNT S2, S3 : Absorption by Semiconducting CNT
M1 : Absorption by Metallic CNT

METHOD FOR SIMPLY SEPARATING CARBON NANOTUBE

TECHNICAL ART

The present invention relates to a method for efficiently separating metallic carbon nanotubes and semiconducting carbon nanotubes from each other in carbon nanotubes (CNT) containing the two.

BACKGROUND ART

CNT have excellent properties of electric characteristics, mechanical strength and others, and studies and developments thereof as ultimate new materials are being made energetically. CNT are produced in various methods of a laser vaporization method, an arc discharge method, a chemical vapor deposition method (CVD method), etc. At present, however, they are produced only as a mixture morphology of metallic CNT and semiconducting CNT in any production methods.

In practical use, the properties of either one only of metallic or semiconducting CNT are needed in many cases, and therefore, the studies of separating and purifying metallic or semiconducting CNT alone from a CNT mixture are considered extremely important from the viewpoint of the practical use of CNT.

Heretofore, there are given some reports relating to separation of metallic CNT and semiconducting CNT from each other; however, all these involve problems in industrial production of metallic CNT and semiconducting CNT. The problems are as follows: (1) As the process includes complicated steps, it could not be automated. (2) The process takes a long time. (3) The process is not applicable to mass-production. (4) The process requires expensive equipment and chemicals. (5) Only either metallic CNT or semiconducting CNT could be obtained. (6) The collection rate is low.

For example, there are known a method of electrophoresing CNT dispersed with a surfactant, on a microelectrode (Non-Patent Reference 1); a method of using amines as a dispersant in a solvent (Non-Patent References 2, 3); and a method of selectively combusting semiconducting CNT with hydrogen peroxide (Non-Patent Reference 4); however, these could not still solve the problems of those mentioned above, especially in that the final product is limited to metallic CNT alone and the collection rate thereof is low.

There are known a method of separating semiconducting CNT by dispersing a mixture of semiconducting CNT and metallic CNT in a liquid, then selectively binding the metallic CNT to particles, and removing the metallic CNT bound to the particles (Patent Reference 1); a method of obtaining semiconducting CNT by treating CNT with a nitronium ion-containing solution followed by filtration and heat treatment to remove the metallic CNT from CNT (Patent Reference 2); a method of using sulfuric acid and nitric acid (Patent Reference 3); a method of obtaining semiconducting CNT by selectively moving and separating CNT through application of an electric field thereto followed by restricting the electroconductivity range (Patent Reference 4).

These could not still solve the problems of those mentioned above, especially in that the final product to be obtained is limited to semiconducting CNT alone and the collection rate thereof is low.

There is known a method of separating CNT dispersed with a surfactant into metallic CNT and semiconducting CNT through density-gradient ultracentrifugation (Non-Patent Reference 5). The method involves some problems in that it requires an extremely expensive instrument of ultracentrifuge and takes a long time for ultracentrifugation, scaling up the ultracentrifuge itself is limited and a plurality of ultracentrifuges must be disposed in parallel, and therefore, automated treatment is difficult.

There is known a method of separation through ion-exchange chromatography by producing a CNT-nucleic acid composite comprising CNT bound to nucleic acid molecules (Patent Reference 5). However, this is problematic in that it requires an expensive synthetic DNA and the collection rate and the purity are not good since the separation accuracy is not so high.

There is known a report of trying separation of metallic and semiconducting CNT from each other by controlling the pH and the ionic intensity of a CNT solution dispersed with a surfactant to cause a different degree of protonation depending on the type of CNT, followed by applying an electric field to the resulting solution for the intended separation (Patent Reference 6). However, the method requires a step of pretreatment with a strong acid for pH and ionic intensity control of the suspended nanotube mixture prior to separation, and therefore, severe process control for the step is inevitable and finally, in addition, the separation of metallic and semiconducting CNT from each other could not be attained (Patent Reference 6, [0116] Example 4).

Also known is gellation of CNT themselves by the use of an ionic liquid (Patent Reference 7, Patent Reference 8); however, these are for the purpose of obtaining a gel of CNT themselves for enhancing the dispersibility of CNT and for processing CNT, not going any further.

As described in the above, all the conventional methods could not solve the above-mentioned problems, and it is desired to develop a method for separating metallic CNT and semiconducting CNT from CNT based on a novel idea.

The present inventors have launched on a novel method of separation of metallic CNT and semiconducting CNT that differs from conventional methods, and have completed a invention mentioned below (Patent Reference 9). The invention is as follows: A "CNT-containing gel" which is CNT previously dispersed and isolated in a gel is prepared, and an electric field is applied to the CNT-containing gel for gel electrophoresis whereupon only metallic CNT move but semiconducting CNT do not move at all, and the semiconducting CNT and the metallic CNT are thereby separated from each other. This method is extremely excellent in that both metallic CNT and semiconducting CNT are obtained and, in addition, the collection rate is high and the separation is attained within a short period of time, and further, using inexpensive equipment, the method is simple and enables large-scale mass-production.

The above method has attained separation of metallic CNT and semiconducting CNT according to an electric separation means of applying an electric field to a CNT-containing gel. Apart from this, the present inventors have further considered that, by using a physical separation means different from the electric separation means, metallic CNT and semiconducting CNT could be separated in a simple operation using further simpler equipment, and have further gone ahead with the studies.

[Non-Patent Reference 1] Advanced Materials 18, (2006) 1468-1470
[Non-Patent Reference 2] J. Am. Chem. Soc. 127, (2005) 10287-10290
[Non-Patent Reference 3] J. Am. Chem. Soc. 128, (2006) 12239-12242
[Non-Patent Reference 4] J. Phys. Chem. B 110, (2006) 25-29

[Non-Patent Reference 5] Nature Nanotechnology 1, (2006) 60-65
[Patent Reference 1] JP-A 2007-31238
[Patent Reference 2] JP-A 2005-325020
[Patent Reference 3] JP-A 2005-194180
[Patent Reference 4] JP-A 2005-104750
[Patent Reference 5] JP-A 2006-512276
[Patent Reference 6] JP-A 2005-527455
[Patent Reference 7] JP-A 2004-142972
[Patent Reference 8] JP-A 2006-282418
[Patent Reference 9] Japanese Patent Application No. 2007-134274

DISCLOSURE OF THE INVENTION

Problems that the Invention is to Solve

An object of the present invention is to provide a novel method and apparatus for separating metallic CNT and semiconducting CNT from CNT.

Means for Solving the Problems

The present inventors have tackled the above-mentioned problems and have found that, when a separation is performed according to a physical separation means using a CNT-containing gel which is the CNT in the gel in a dispersed and isolated state prepared by previously dispersing and solubilizing CNT with a surfactant, and then ultrasonically treating them to make the CNT disperse and isolate, then the semiconducting carbon nanotubes are made to exist in a gel while the metallic carbon nanotubes are in a solution to thereby separate the semiconducting carbon nanotubes and the metallic carbon nanotubes (FIG. 1). "Physical separation means" as referred to herein includes those under mechanical load given thereto such as centrifugation (FIG. 1A) and freezing/thawing followed by squeezing (FIG. 1B), and in addition thereto, those based on a substance movement phenomenon such as diffusion (FIG. 1C) and permeation (FIG. 1D), as well as operation of taking out the solution alone from a mixture of a gel and a solution (FIG. 1A, FIG. 1C, FIG. 1D). The separation principle of the invention is considered to be based on the knowledge that metallic CNT and semiconducting CNT differ from each other in the interaction thereof with surfactant and gel, or that is, semiconducting CNT having strong interactivity with gel are separated in gel while metallic CNT having strong interactivity with surfactant are separated in solution.

Regarding "application of a physical separation means to a CNT-containing gel to separate metallic CNT and semiconducting CNT", there exists no conventional example as far as the present inventors know. (The invention of Patent Reference 9 made by the present inventors is for separating metallic CNT and semiconducting CNT by applying an electric means differing from a physical means to a CNT-containing gel.)

The present invention has been made on the basis of the above novel finding.

Specifically, the application provides the following invention:

<1> A method for separating metallic CNT and semiconducting CNT comprising treating with a physical separation means using a CNT-containing gel to thereby make semiconducting CNT exist in gel and make metallic CNT exist in solution.

<2> The method for separating metallic CNT and semiconducting CNT in <1>, wherein the CNT-containing gel is the CNT in the gel in a dispersed and isolated state prepared by previously dispersing and solubilizing CNT with a surfactant, and then ultrasonically treating them to make the CNT disperse and isolate.

<3> The method for separating metallic CNT and semiconducting CNT in <1> or <2>, wherein the treatment according to a physical separation means comprises centrifuging the CNT-containing gel with a centrifuge to make a solution fraction containing metallic CNT in the solution eluted from the gel through the centrifugation and a gel fraction containing semiconducting CNT in the gel compressed by the centrifugation, and then separating the solution fraction and the gel fraction from each other (FIG. 1A-1).

<4> The method for separating metallic CNT and semiconducting CNT in <1> or <2>, wherein the treatment according to a physical separation means comprises freezing the CNT-containing gel, and then squeezing the gel obtained by thawing to thereby separate it into a solution containing metallic CNT in the solution eluted from the gel and a gel containing semiconducting CNT in the compressed gel (FIG. 1B).

<5> The method for separating metallic CNT and semiconducting CNT in <1> or <2>, wherein the treatment according to a physical separation means comprises dipping the CNT-containing gel in a solution thereby making a metallic CNT-containing solution formed by diffusing and eluting metallic CNT from the gel to the solution, and a semiconducting CNT-containing gel, and separating the solution fraction and the gel fraction from each other (FIG. 1C).

<6> The method for separating metallic CNT and semiconducting CNT in <1> or <2>, wherein the treatment according to a physical separation means comprises centrifuging, using a centrifuge, the gel prepared by freezing and thawing the carbon nanotubes-containing gel to make a solution fraction containing metallic carbon nanotubes in the solution eluted from the gel through the centrifugation and a gel fraction containing semiconducting carbon nanotubes in the compressed gel, and thereafter separating the solution fraction and the gel fraction from each other (FIG. 1A-2).

<7> The method for separating metallic CNT and semiconducting CNT in <1> or <2>, wherein a gel and a CNT dispersion are mixed to thereby make semiconducting CNT permeate into the gel and make metallic CNT concentrated in a solution, and the metallic CNT-containing solution is taken out of the CNT-containing gel according to a physical separation means (FIG. 1D).

<8> The method for separating metallic CNT and semiconducting CNT in <2>, wherein the surfactant is an anionic surfactant or an ampholytic surfactant.

<9> The method for separating metallic CNT and semiconducting CNT in <8>, wherein the anionic surfactant is alkyl sulfate salt, sodium dodecanesulfonate, sodium dodecanoyl sarcosine, sodium dodecanoate, or sodium cholate.

<10> The method for separating metallic CNT and semiconducting CNT in <9>, wherein the alkyl sulfate salt is sodium dodecyl sulfate, sodium decyl sulfate or sodium tetradecyl sulfate.

<11> The method for separating metallic CNT and semiconducting CNT in <8>, wherein the ampholytic surfactant is n-dodecylphosphocholine.

<12> An apparatus for separating metallic carbon nanotubes and semiconducting carbon nanotubes, comprising:
a vessel for storing a carbon nanotubes-containing gel,
a cooling means for cooling the carbon nanotubes-containing gel,
a freezing means for freezing the cooled, carbon nanotubes-containing gel, a thawing means for thawing the frozen, carbon nanotubes-containing gel, a squeezing means for squeezing the frozen, carbon nanotubes-containing gel.

<13> The apparatus for separating metallic carbon nanotubes and semiconducting carbon nanotubes in <12>, wherein the squeezing means is a roller (FIG. 19).

<14> An apparatus for separating metallic carbon nanotubes and semiconducting carbon nanotubes, comprising:

a vessel for storing a carbon nanotubes-containing gel, a cooling means for cooling the carbon nanotubes-containing gel, a freezing means for freezing the cooled, carbon nanotubes-containing gel, a thawing means for thawing the frozen, carbon nanotubes-containing gel, an eluting means for eluting the frozen, carbon nanotubes-containing gel.

<15> The apparatus for separating metallic carbon nanotubes and semiconducting carbon nanotubes in <14>, wherein the eluting means comprises dipping in an eluent (FIG. 20).

<16> An apparatus for separating metallic carbon nanotubes and semiconducting carbon nanotubes, comprising:

a vessel for storing a carbon nanotubes-containing gel, a cooling means for cooling the carbon nanotubes-containing gel, a freezing means for freezing the cooled, carbon nanotubes-containing gel, a thawing means for thawing the frozen, carbon nanotubes-containing gel, a separation means for separating the frozen, carbon nanotubes-containing gel.

<17> The apparatus for separating metallic carbon nanotubes and semiconducting carbon nanotubes in <16>, wherein the separation means is a centrifuge (FIG. 21).

<18> The apparatus for separating metallic carbon nanotubes and semiconducting carbon nanotubes in <12>, <14> or <16>, wherein the carbon nanotubes-containing gel-storing vessel comprises a carbon nanotubes-storing vessel and a gelling agent-storing vessel (FIG. 22).

Advantage of the Invention

According to the invention, in separating metallic CNT and semiconducting CNT from CNT, the separation is performed according to a physical separation means using a gel that contains CNT in a dispersed and isolated state, whereby the metallic CNT and the semiconducting CNT can be separated within a short period of time in a simplified manner. The physical separation means may be up-scaled with ease in accordance with the production scale, and therefore an industrial-scale apparatus for the invention may be suitably constructed. The invention provides surely effective method and apparatus for separating metallic CNT and semiconducting CNT from CNT.

DESCRIPTION OF REFERENCE NUMERALS

Figure 1:
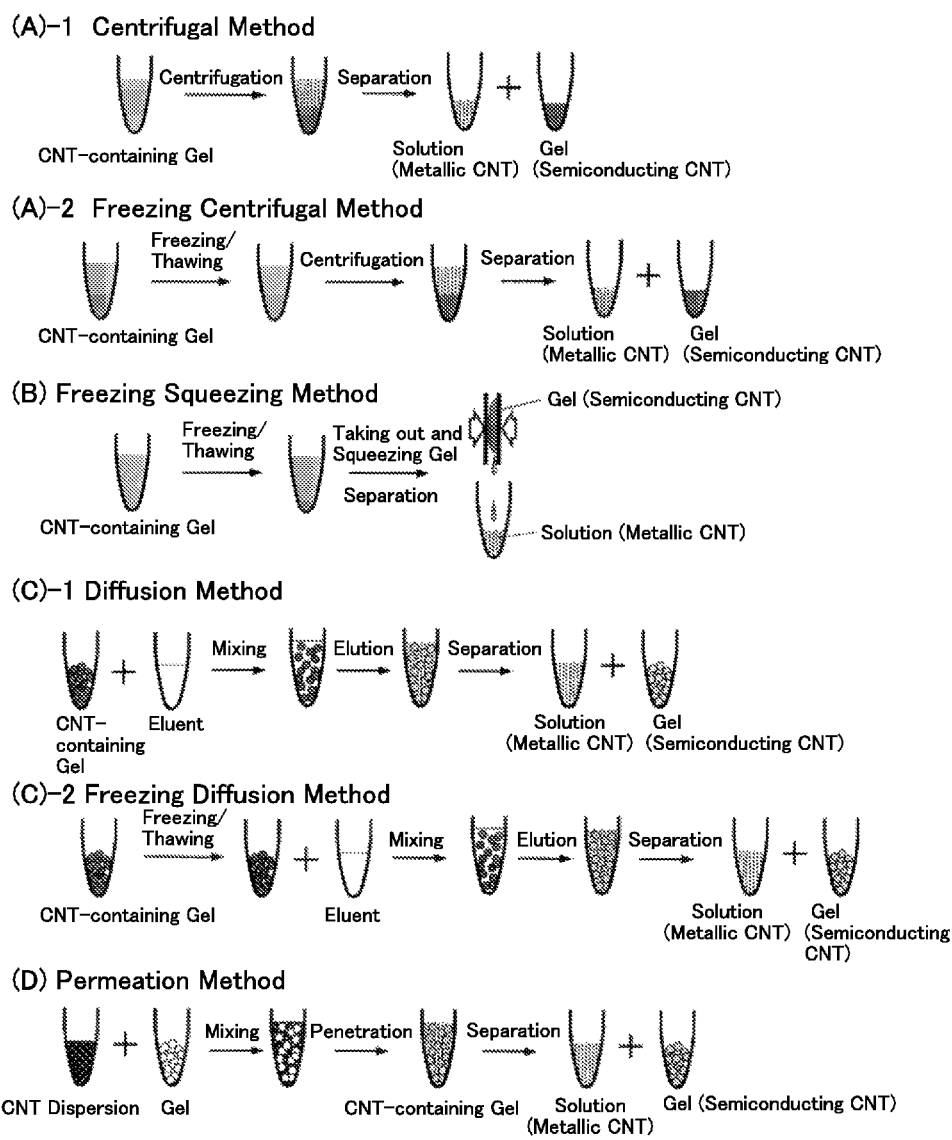
[FIG. 1] This is a view showing a physical means for separating metallic CNT and semiconducting CNT using gel.

1 Separation Apparatus
2 Sample Tank
3 Belt Conveyor
4 Freezer
5 Roller
6, 7 Collector 8 Metallic CNT Solution
9 Semiconducting CNT-Containing Gel
10 Cooling (gellation) Step
11 Freezing Step
12 Thawing Step
13 Squeezing Step
14 Elution Step
15 Centrifuge
16 Centrifugation (dewatering) Step
17 Mixing Valve

BEST MODE FOR CARRYING OUT THE INVENTION

The present invention is a method directed to a mixture containing metallic CNT and semiconducting CNT (hereinafter this may be simply referred to as CNT) for separating the metallic CNT and the semiconducting CNT.

CNT to be separated here are not defined in point of the production method, the shape (diameter and length) and the structure (single-walled, double-walled, etc.) thereof, and the invention may be directed to any CNT for separating metallic CNT and semiconducting CNT.

In general, the structure of CNT is primarily defined by a chiral index composed of a pair of two integers (n, m). Metallic CNT and semiconducting CNT as referred to in the invention are classified from carbon nanotubes in accordance with the electric properties thereof. Metallic CNT are defined as those having a chiral index of n−m=(multiple of 3); and semiconducting CNT are as the others (having a chiral index, n−m=not multiple of 3) (Non-Patent Reference 6: Riichiro Saito & Hisanori Shinohara, "Basis and Application of Carbon Nanotubes" by Baifu-kan, pp. 13-22).

[Regarding Preparation of CNT Dispersion]

Synthesized CNT are, in general, tens to hundreds of bundles of both metallic and semiconducting CNT. Prior to separating them into metallic CNT and semiconducting CNT, the bundles must be dispersed and solubilized as individual CNT isolated from each other, and the individual CNT must be kept stable for a long period of time.

A mixture of metallic CNT and semiconducting CNT is added to a solution to which a surfactant has been added as a dispersant, and fully treated with ultrasonic waves whereby the CNT are individually dispersed and isolated from each other. The dispersion contains dispersed isolated CNT, CNT still in the form of bundles as neither dispersed nor isolated, amorphous carbon as a side product, and metal catalyst, etc.

After the ultrasonic treatment, the dispersion is centrifuged, whereby the CNT bundles, amorphous carbon and metal catalyst are precipitated, and the isolated CNT forming a micelle with a surfactant can be collected in the supernatant. The obtained supernatant is the sample for separation of metallic CNT and semiconducting CNT.

Water is most preferred as the solvent in preparing the CNT dispersion. From this viewpoint, water is used in preparing the CNT dispersion.

As the surfactant, herein usable is any of anionic surfactants, cationic surfactants, ampholytic surfactants and nonionic surfactants.

As the anionic surfactant, preferred are alkyl sulfate-type surfactants having from 10 to 14 carbon atoms, as well as dodecanesulfonic acid, dodecanoyl sarcosine, dodecanoic acid, cholic acid, etc. As the ampholytic surfactant, preferred are n-dodecylphosphocholine, etc. These surfactants may be mixed for use herein. They may be combined with any other surfactant. The surfactant to be combined with them may be any of anionic surfactants, cationic surfactants, ampholytic surfactants, nonionic surfactants, and also other dispersants such as high-molecular polymers, DNA, proteins, etc. The concentration of the dispersant such as surfactant may vary depending on the type and the concentration of CNT to be used and the type of the dispersant to be used, but in general, its final concentration could be from 0.01% to 25%.

According to the method, the concentration of CNT in the dispersion can be from 1 μg/ml to 10 mg/ml, preferably from 0.1 mg/ml to 1 mg/ml.

[Regarding Gel to be Used]

The material to constitute the gel for use for the CNT-containing gel may be conventional known agarose, arylamide, starch or the like; and a gel prepared by gelling them, such as agarose gel, acrylamide gel, starch gel or the like is used. Based on the behavior difference between metallic CNT and semiconducting CNT in a gel containing them, the above-mentioned substances produce favorable results, and from this viewpoint, the substances are recommended.

In general, the gel concentration of the CNT-containing gel is preferably from 0.01% to 25% as the final concentration thereof.

The process of preparing the "CNT-containing gel" that contains CNT as dispersed in the gel includes a method of mixing a CNT dispersion and a solution of a gel such as agarose followed by cooling for gelling it; a method of dipping a gel or a dried gel in a CNT dispersion to thereby make CNT permeate into the gel; a method of electrically introducing a CNT dispersion into a gel; a method of mixing a CNT dispersion and acrylamide followed by adding a polymerization initiator for gel formation, etc. Any other known method than those may be suitably employed here for introducing CNT into gel.

Regarding Separation of Metallic CNT and Semiconducting CNT from CNT-Containing Gel:

The invention is a method for separating metallic CNT and semiconducting CNT from a CNT-containing gel according to a physical separation means as described above.

The physical separation means includes the following. These methods may be suitably combined.

(1) Centrifugal Method

[Centrifugal Method] (FIG. 1(A)-1)

This method comprises applying, using a centrifuge, a centrifugal force of approximately from $10^4$ to $10^5$ times the gravitational force to a CNT-containing gel to squeeze the gel thereby giving a solution fraction containing metallic CNT in the solution eluted from the gel and a gel fraction containing semiconducting CNT in the compressed gel, and then separating the two from each other.

The centrifugal acceleration in centrifuging a CNT-containing gel may be determined depending on the situation, but is, for example, from $10^4 \times g$ to $10^6 \times g$ or so. The temperature may also be determined depending on the situation, but is, for example, from 4 to 30° C. or so.

The ratio in separating the solution fraction containing metallic CNT in the solution eluted from the gel and a gel fraction containing semiconducting CNT in the compressed gel may differ depending on the gel concentration to be used, the time for centrifugation and the gravitational acceleration. For example, in case where 0.4 ml of a CNT-containing gel that contains 0.4% agarose gel is centrifuged under 16,000×g, the result is that the solution fraction is 0.27 ml and the gel fraction is 0.13 ml after 1 hour, the solution fraction is 0.30 ml and the gel fraction is 0.10 ml after 2 hours, and the solution fraction is 0.32 ml and the gel fraction is 0.08 ml or so after 3 hours.

[Freezing Centrifugal Method] (FIG. 1(A)-2, FIG. 21)

This method comprises centrifuging a gel prepared by freezing and thawing a CNT-containing gel, using a centrifuge, to thereby separate it into a solution fraction containing metallic CNT in the solution eluted from the gel and a gel fraction containing semiconducting CNT in the compressed gel.

Figure 19:
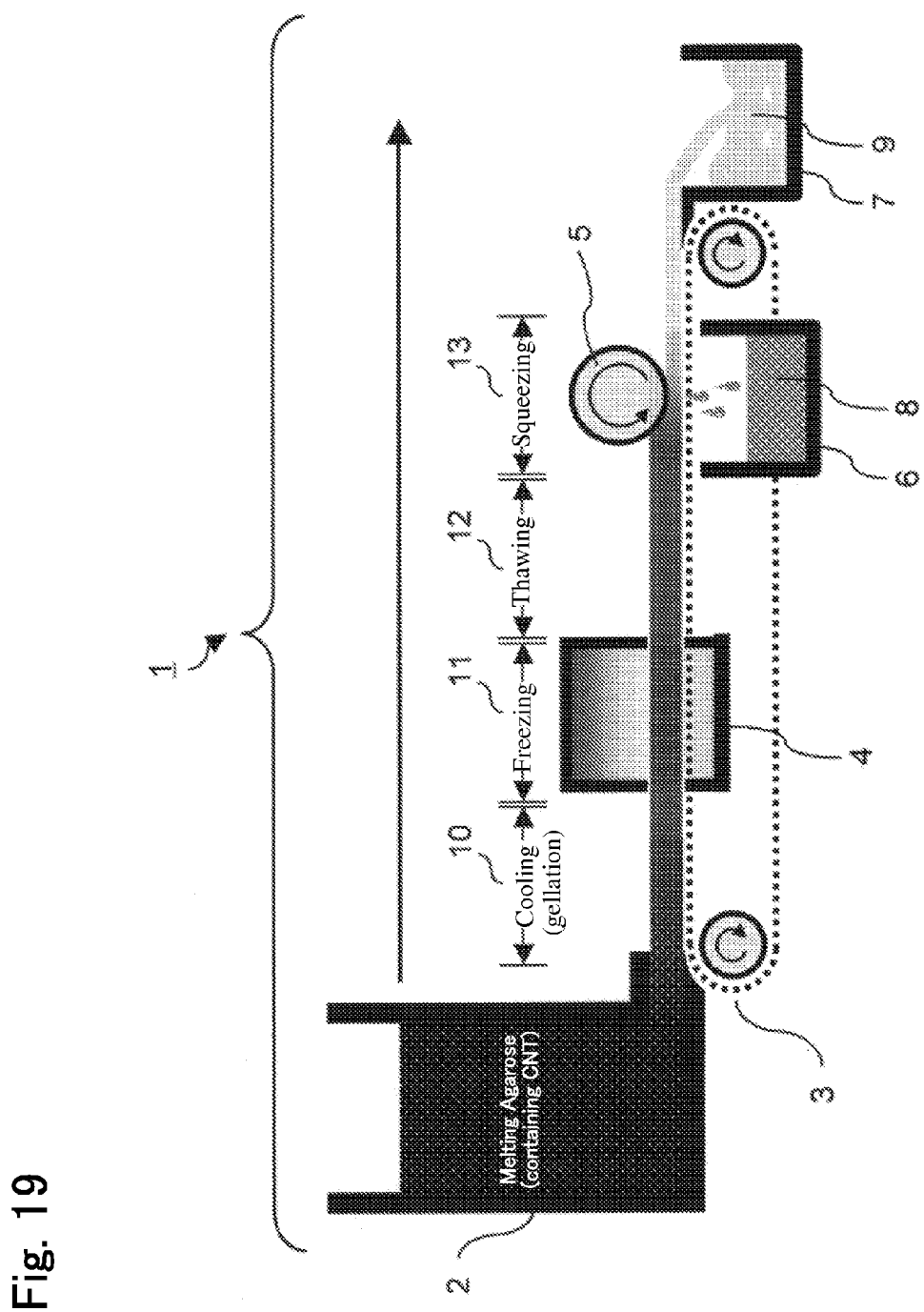
[FIG. 19] This is a CNT separation apparatus according to a freezing squeezing method.
Figure 20:
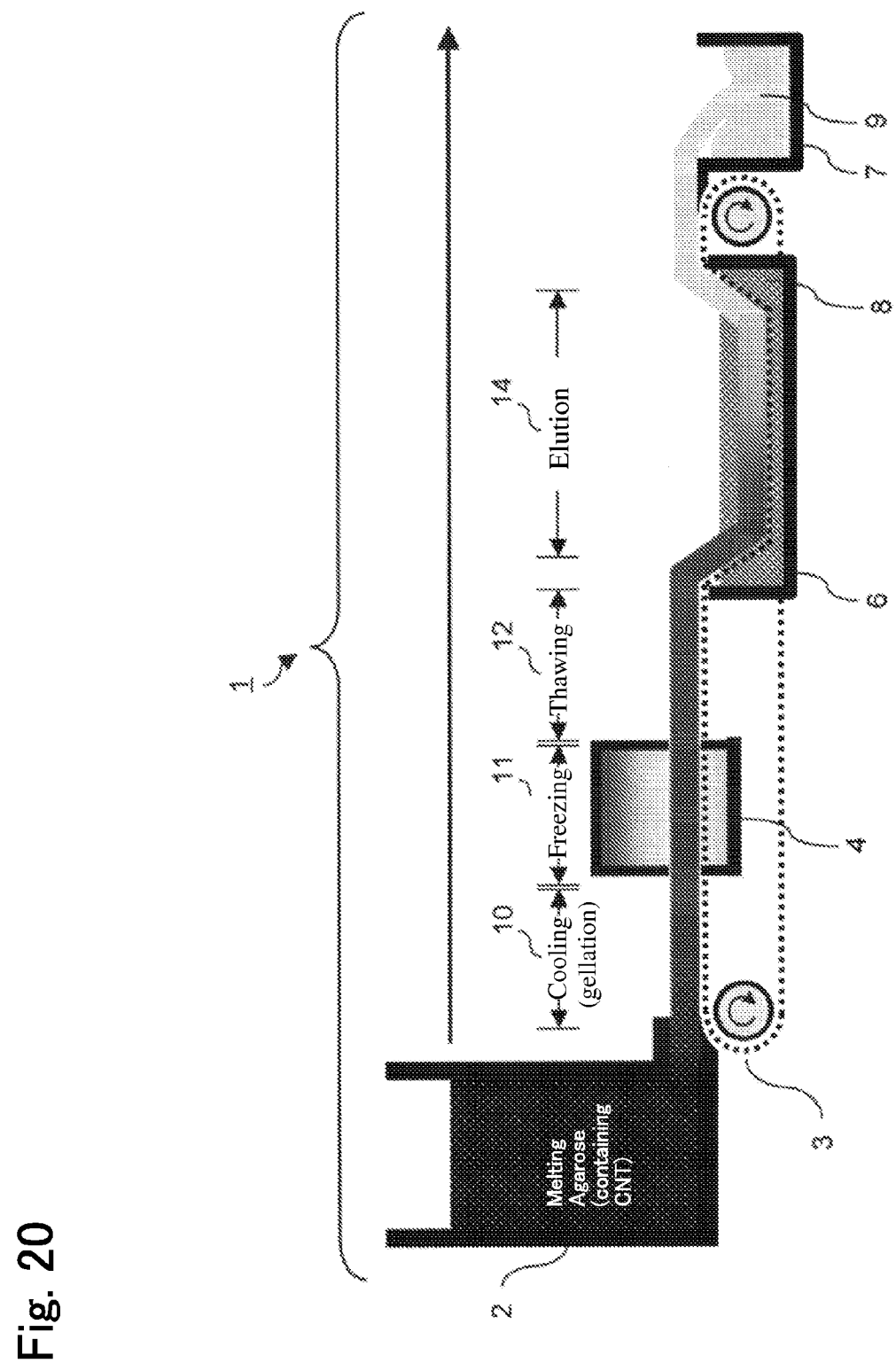
[FIG. 20] This is a CNT separation apparatus according to a freezing diffusion method.
Figure 21:
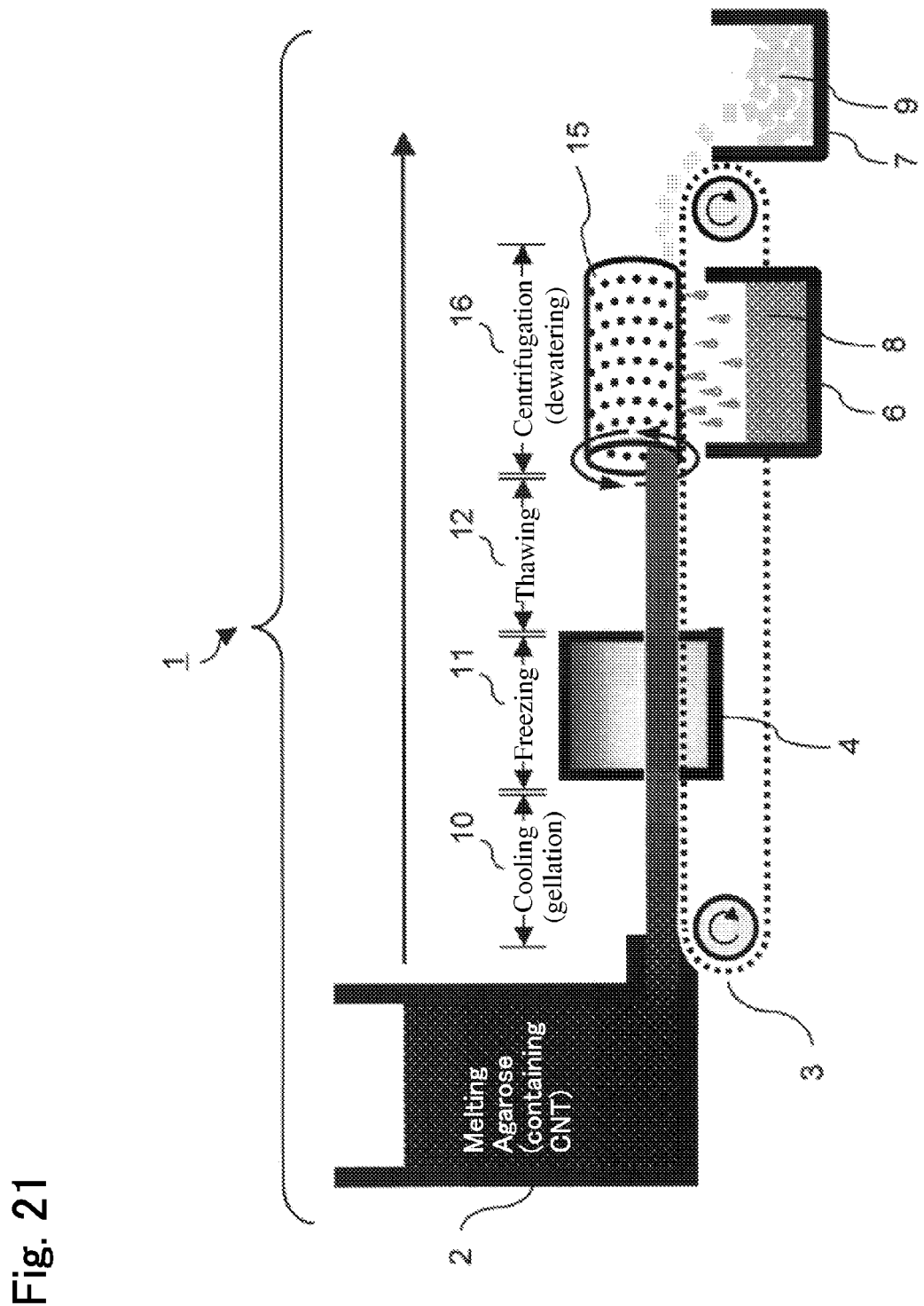
[FIG. 21] This is a CNT separation apparatus according to a freezing centrifugal method.
Figure 22:
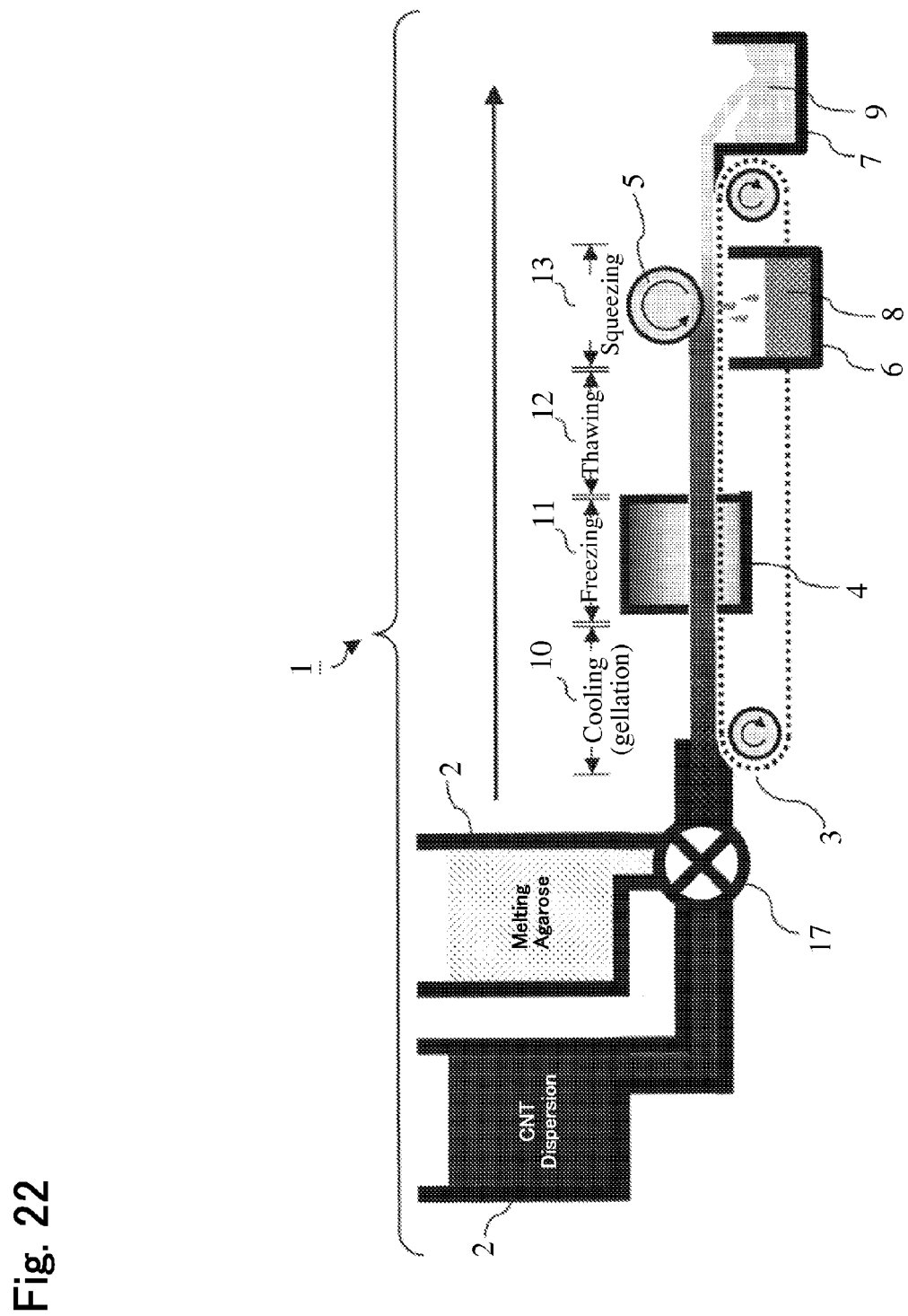
[FIG. 22] This is a CNT separation apparatus according to a freezing squeezing method.

(2) Freezing Squeezing Method (FIG. 1(B), FIG. 19)

This method comprises freezing a CNT-containing gel, then thawing and squeezing it to thereby separate it into a solution containing metallic CNT in the solution eluted from the gel and a gel containing semiconducting CNT in the compressed gel.

The gel changes its network structure in the freezing and thawing step, and under the condition, a liquid part may be squeezed out from the gel by a force on a level of a pinching force by fingers, and not using a centrifuge, the gel may be separated into metallic CNT and semiconducting CNT.

Regarding the temperature for freezing and thawing the CNT-containing gel, concretely, the freezing temperature may be from −80° C. to −20° C. or so, and the thawing temperature may be room temperature (15° C. to 25° C.) or so.

For squeezing it, the frozen and thawed gel may be taken out into a wrap, and may be directly pushed, or as the case may be, it may be pinched with fingers and squeezed, or the vessel with the gel therein may be centrifuged with a centrifuge to squeeze it by a centrifugal force.

The ratio of the solution containing metallic CNT eluted from the gel and the gel containing compressed semiconducting CNT may vary depending on the condition such as the gel concentration to be used; and in general, the ratio may be 3/1 or so by volume.

(3) Diffusion Method

[Diffusion Method (FIG. 1(C)-1)]

When a CNT-containing gel is dipped in a solution, metallic CNT can be diffused and eluted from the gel into the solution. This method is based on this characteristic feature for separating the gel into a metallic CNT-containing solution and a semiconducting CNT-containing gel.

In the step of elution, a surfactant may be added to the eluent so that the dispersed CNT do not aggregate.

The ratio of the CNT-containing gel and the solution may vary depending on the concentration of CNT, but is, for example, from an equivalent amount to 10 times amount or so.

The time for elution may vary depending on the concentration and the size of the gel to be used, but is, for example, from 30 minutes to 20 hours or so.

[Freezing Diffusion Method (FIG. 1(C)-2, FIG. 20)]

By dipping a gel prepared by freezing and thawing a CNT-containing gel, in a solution, metallic CNT can be diffused and eluted from the gel into the solution. This method is based on this characteristic feature for separating the gel into a metallic CNT-containing solution and a semiconducting CNT-containing gel.

(4) Permeation Method

This method comprises dipping a gel in a CNT dispersion to give a gel selectively taking semiconducting CNT into the gel and a dispersion containing the remaining metallic CNT, followed by separating them from each other into metallic CNT and semiconducting CNT (FIG. 1D).

In the step of selectively taking semiconducting CNT into the gel, a surfactant may be added to the gel so that the dispersed CNT do not aggregate.

The concentration and the composition of the gel may be the same as those of the gel simulated by removing CNT from the CNT-containing gel.

The ratio of the gel and the CNT dispersion may be from an equivalent amount to 10 times amount or so.

The time to be taken for permeation may vary depending on the concentration and the size of the gel to be used, but is, for example, from 30 minutes to 20 hours or so.

To estimate the proportion of metallic CNT and semiconducting CNT, UV-visible range-near IR absorptiometry is employed.

Figure 2:
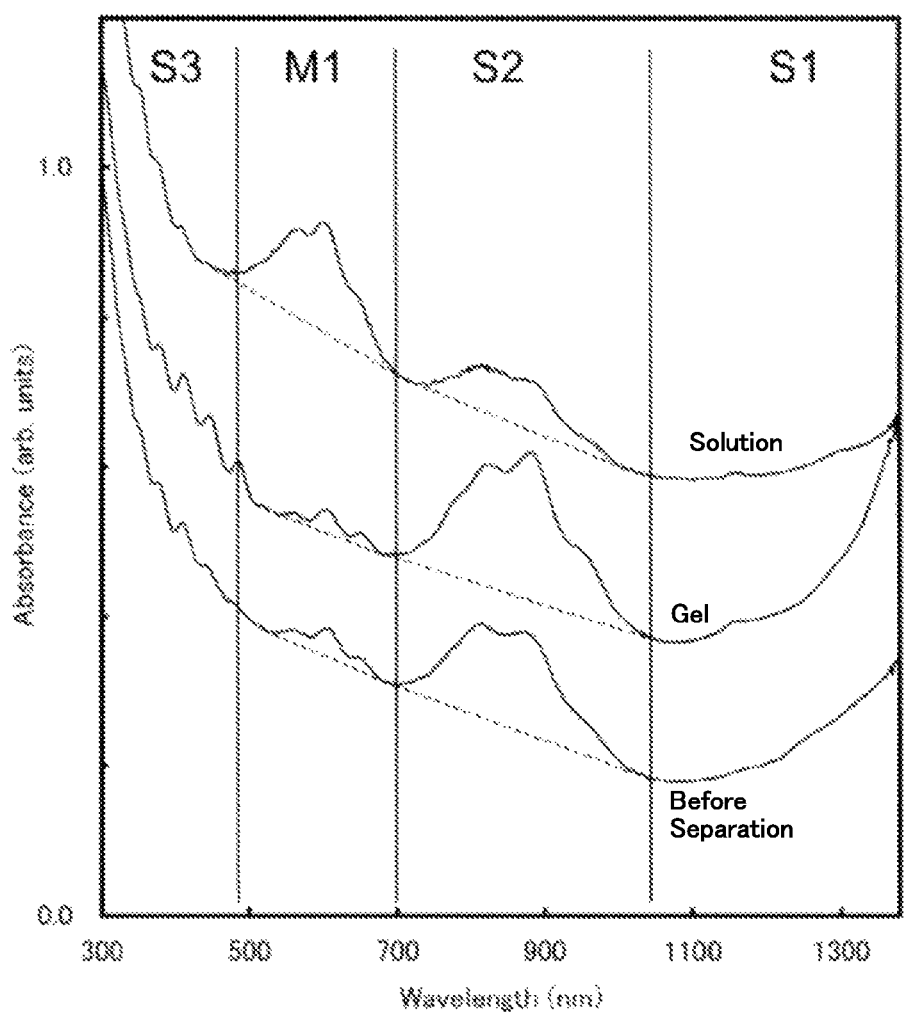
[FIG. 2] This is a view showing light absorption spectra of CNT separated according to a centrifugal method (Example 1, Laser-CNT, SDS).

The result in a case where CNT produced according to a laser evaporation method (Laser-CNT, diameter 1.2±0.1 nm) are used is described (FIG. 2). The absorption wavelength range referred to as M1 (about 500 to 700 nm) is from metallic CNT. The three absorption wavelength ranges of S1 (about 1050 nm or more), S2 (about 700 to 1050 nm) and S3 (about 500 nm or less) are from semiconducting CNT. Here the ratio of metallic CNT and conducting CNT is estimated from the ratio of the peak size in M1 and S2. Depending on the mean diameter of the CNT analyzed, the absorption wavelength range (M1, S1, S2, S3) varies. When the mean diameter is smaller, then the range is shifted to the short wavelength side; and when the mean diameter is larger, it is shifted to the long wavelength side.

The invention is described in more detail with reference to the following Examples, to which, however, the invention should not be limited.

EXAMPLES

Example 1

CNT produced according to a laser evaporation method (Laser-CNT) were used as a sample, and these were separated into metallic CNT and semiconducting CNT according to a centrifugal method.

[Preparation of Laser-CNT]

A powder of nickel oxide and a powder of cobalt oxide were mixed with a high-purity graphite powder having a mean particle size of 5 microns in an amount of 0.6% each, and uniformly mixed. This was shaped and solidified in rods with a phenolic resin, and fired in an inert gas at 1200° C. for 2 hours. Here this was used as a target. The target was put in a quartz tube filled with an atmosphere of 760 Torr argon gas, and while argon gas was introduced thereinto in an amount of 100 cc/minute or so, the entire quartz tube was heated up to 1050° C. The target surface was irradiated with Nd:YAG laser light of 450 mJ/pulse, whereby carbon, nickel and cobalt were evaporated away. This aggregated in the electric furnace to form single-walled carbon nanotubes adhering to the inner wall of the quartz tube, and this was collected to be a material sample.

The material sample was dispersed in water having a peroxide concentration of 15%, refluxed therein at 100° C. for 2 hours, and then the catalyst metal was removed with hydrochloric acid, thereby giving purified Laser-CNT (diameter 1.2±0.1 nm).

[Preparation of CNT Dispersion]

Aqueous 2% SDS solution (2 ml) was added to the Laser-CNT (0.6 mg). The solution was ultrasonically treated, using a tip-type ultrasonic homogenizer (Taitec's VP-15; tip diameter 3 mm).

In this step, the vessel was kept cooled in cold water, and treated in repeated cycles of 0.7 second ON-0.3 second OFF at an output level of 2, for a total of 5.7 hours (total ON-time, 4 hours).

After the ultrasonic treatment, the dispersion was centrifuged (16,000×g, 15 hours, 25° C.), and then the supernatant was collected. The solution contains many CNT isolated and dispersed with surfactant.

[Preparation of Dispersed CNT-containing Gel]

A TB buffer containing 1.4% low-melting-point agarose and having a 2-fold concentration (50 mM trishydroxymethylaminomethane, 48.5 mM boric acid (pH 8.2)) was completely dissolved using a microwave oven, and the resulting solution was quickly mixed with the previous CNT dispersion in the same amount (0.2 ml) each, in a microtube (capacity, 1.5 ml). (In this, the final concentration of agarose was 0.7%.) This was left cooled at room temperature for 30 minutes until the mixture gelled. After solidified and gelled, this became a CNT-containing gel. In the obtained CNT-containing gel, CNT were dispersed in the gel, as isolated from each other.

[ELUTION of Metallic CNT from CNT-Containing Gel Through Centrifugation]

The CNT-containing gel obtained in the above was centrifuged (16,000×g, 3 hours, 25° C.), Through centrifugation, a gel gathered at the bottom of the microtube as compressed, and a solution was eluted in the upper part. After the centrifugation, the solution in the upper part was bluish gray. The bluish gray color is characteristic of metallic Laser-CNT.

[Photoabsorption Spectrometry]

The collected upper solution and gel were separately mixed with 2% SDS solution (or pure water) up to 1 ml. The gel was dissolved in a hot bath, and then analyzed for photoabsorption spectrometry with a UV-visible range-near IR spectrophotometer (Shimadzu Solid Spec-3700).

The photoabsorption spectral patterns of the CNT separated according to the centrifugal method are shown in FIG. 2. The spectrum before separation, that of the gel fraction and that of the solution fraction are shown as shifted in the vertical axis direction.

As compared with the absorption by semiconducting CNT (S2) and the absorption by metallic CNT (M1) in the spectrum of the CNT dispersion before separation, the proportion of M1 of metallic CNT significantly increased in the spectrum of the solution fraction after separation, and this confirms the separation of metallic CNT. On the contrary, the proportion of the absorption by semiconducting CNT (S2) increased in the gel fraction, and this confirms the separation of semiconducting ONT.

The above results clearly show that, according to the present method, metallic CNT and semiconducting CNT can be separated and collected in an extremely simplified manner.

Example 2

The gel concentration was varied, and metallic CNT and semiconducting CNT were separated according to a centrifugal method.

The process of this experiment was the same as in Example 1, except that the agarose final concentration (0.7%) in the CNT-containing gel was varied within a range of from 0.1 to 0.8%.

Figure 3:
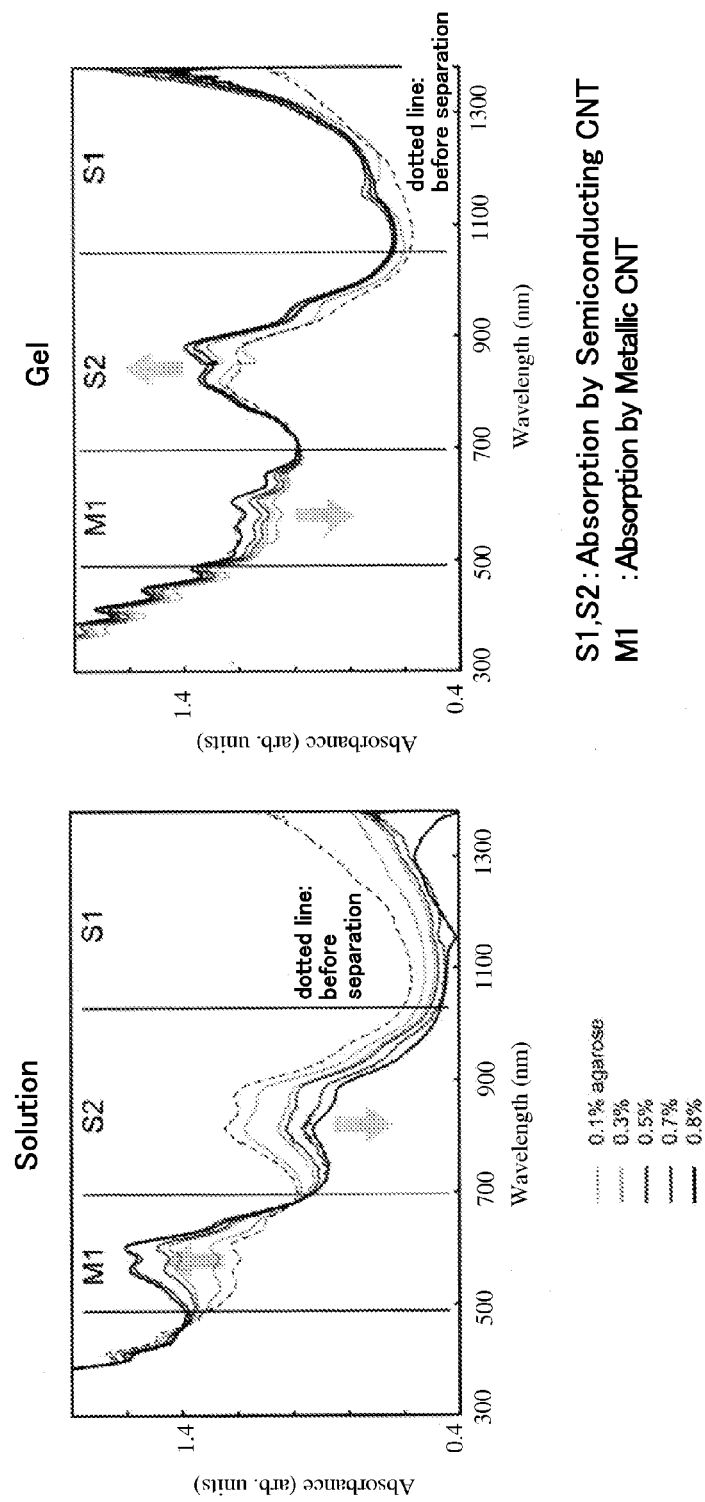
[FIG. 3] This is a view showing light absorption spectra of CNT separated according to a centrifugal method with changing the gel concentration (Example 2, Laser-CNT, SDS).

The photoabsorption spectral patterns of CNT separated according to a centrifugal method where the gel concentration was varied are shown in FIG. 3. The patterns of the solution fraction are in the left-side graph; and the patterns of the gel fraction are in the right-side graph. In these, the spectral patterns given with a different gel concentration are shown as superimposed.

The patterns of the solution fraction are referred to. As compared with the spectrum of the CNT dispersion before separation (dotted line), the absorption by metallic CNT (M1) increased while the absorption by semiconducting CNT (S2) decreased, with the increase in the gel concentration. On the other hand, in the patterns of the gel fraction, the absorption by semiconducting CNT (S2) increased with the decrease in the gel concentration.

The above results show that when the gel concentration is set suitably, then metallic CNT and semiconducting CNT can be separated and collected each at high purity.

Example 3

A sample of Hipco-CNT (by CNI, CNT produced through chemical vapor deposition, having a diameter of 1.0±0.3 nm) was treated according to a centrifugal method in which the gel concentration was varied, and separated into metallic CNT and semiconducting CNT.

The process of this experiment was the same as in Example 1 except that Hipco-CNT were used in place of Laser-CNT and that the agarose final concentration (0.7%) in the CNT-containing gel was varied within a range of from 0.05 to 1.0%.

Figure 4:
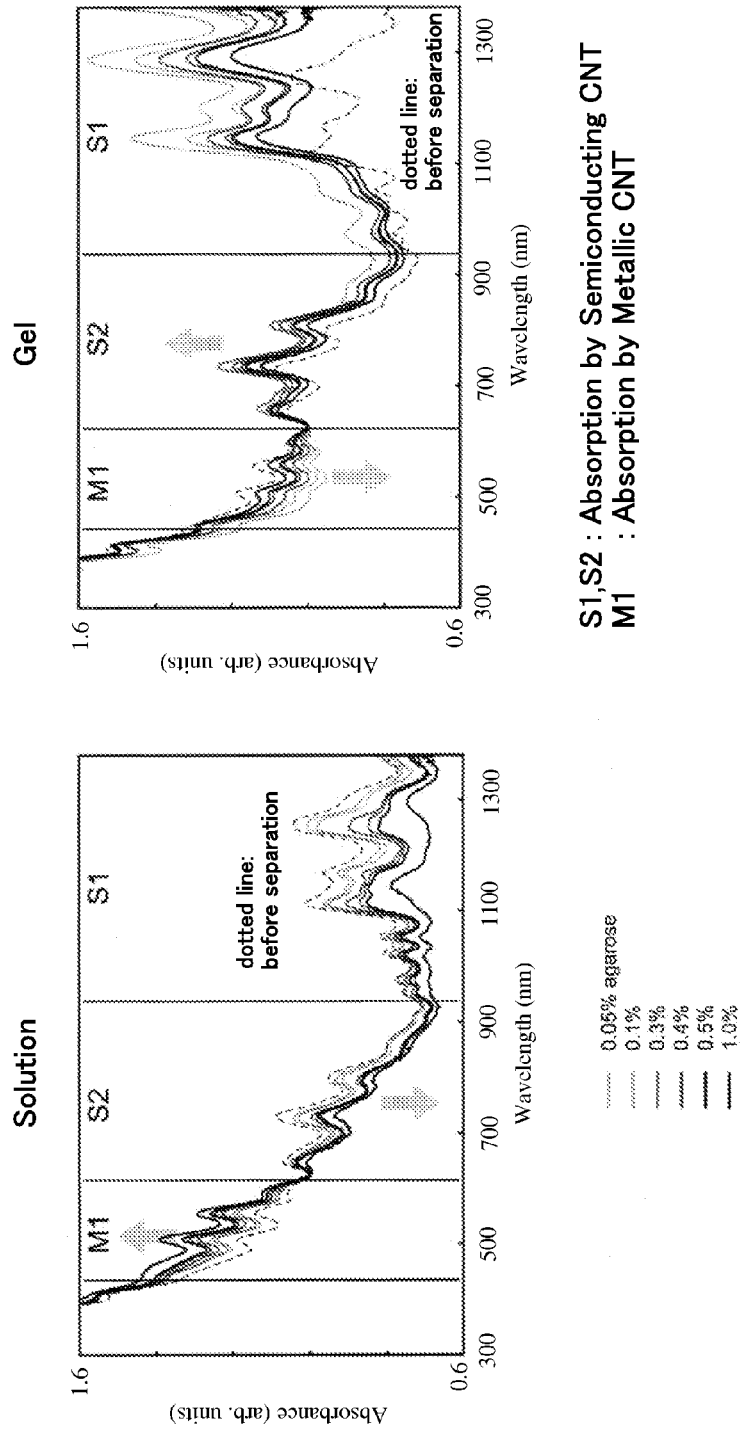
[FIG. 4] This is a view showing light absorption spectra of CNT separated according to a centrifugal method with changing the gel concentration (Example 3, Hipco-CNT, SDS).

The photoabsorption spectral patterns of CNT separated according to a centrifugal method where the gel concentration was varied are shown in FIG. 4. The patterns of the solution fraction are in the left-side graph; and the patterns of the gel fraction are in the right-side graph. In these, the spectral patterns given with a different gel concentration are shown as superimposed.

The patterns of the solution fraction are referred to. As compared with the spectrum of the CNT dispersion before separation (dotted line), the absorption by metallic CNT (M1) increased while the absorption by semiconducting CNT (S2) decreased, with the increase in the gel concentration. On the other hand, in the patterns of the gel fraction, the absorption by semiconducting CNT (S2) increased with the decrease in the gel concentration.

The above results show that not only Laser-CNT but also Hipco-CNT can be separated into metallic CNT and semiconducting CNT in an extremely simplified manner, and that when the gel concentration is set suitably, then metallic CNT and semiconducting CNT can be separated and collected each at high purity.

Example 4

A sample of Laser-CNT was treated according to a centrifugal method with a surfactant of sodium tetradecyl sulfate (STS), and separated into metallic CNT and semiconducting CNT.

The process of this experiment was the same as in Example 1, except that 2% STS was used as the surfactant in place of 2% SDS and that the agarose final concentration in the CNT-containing gel was 0.4%.

Figure 5:
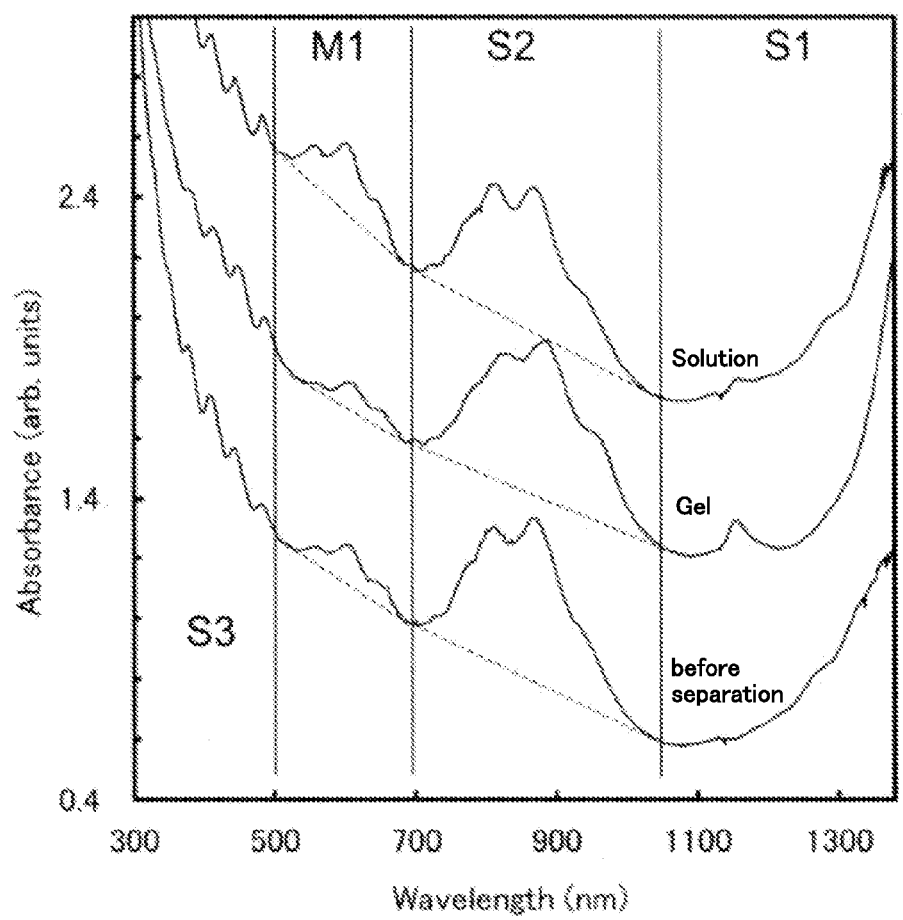
[FIG. 5] This is a view showing light absorption spectra of CNT separated according to a centrifugal method (Example 4, Laser-CNT, STS).

The photoabsorption spectral patterns of CNT separated according to a centrifugal method are shown in FIG. 5. The spectrum before separation, that of the gel fraction and that of the solution fraction are shown as shifted in the vertical axis direction.

As compared with the absorption by semiconducting CNT (S2) and the absorption by metallic CNT (M1) in the spectrum of the CNT dispersion before separation, the proportion of M1 of metallic CNT significantly increased in the spectrum of the solution fraction after separation. On the contrary, the proportion of the absorption by semiconducting CNT (S2) increased in the gel fraction. The above results clearly show that in the case where STS is used, metallic CNT and semiconducting CNT can be separated and collected in an extremely simplified manner.

Example 5

A sample of Laser-CNT was treated according to a centrifugal method with a surfactant of sodium cholate (SC), and separated into metallic CNT and semiconducting CNT.

The process of this experiment was the same as in Example 1, except that 4% SC was used as the surfactant in place of 2% SDS and that the agarose final concentration in the CNT-containing gel was 0.4%.

Figure 6:
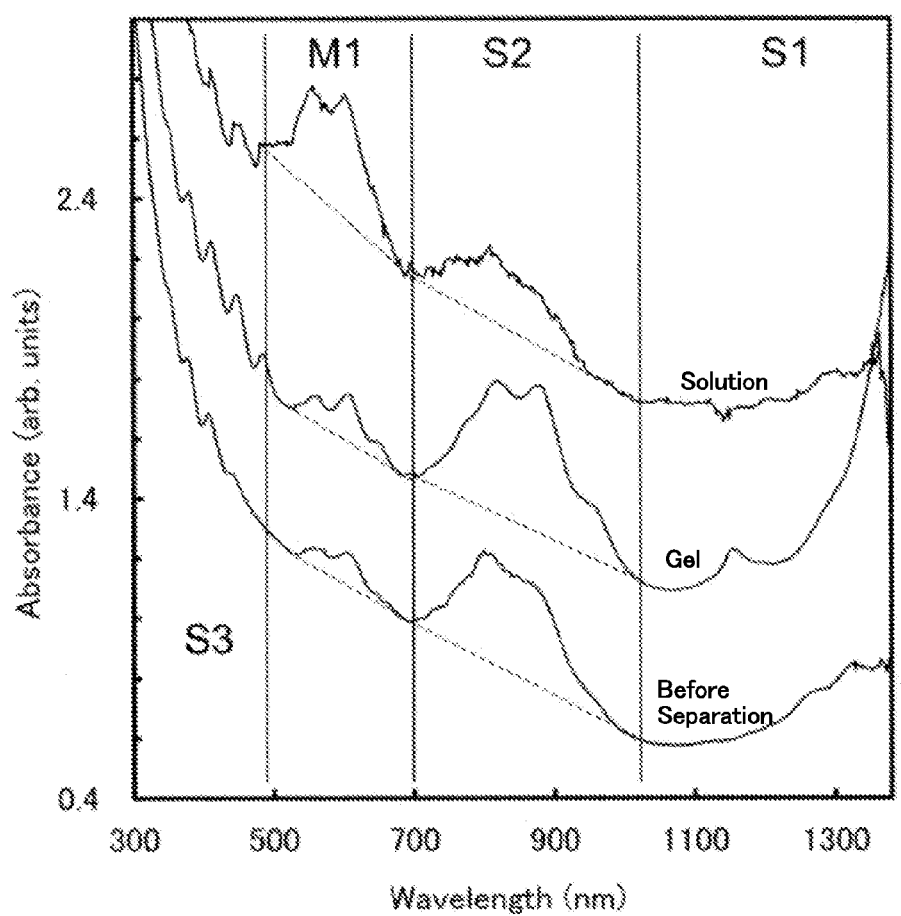
[FIG. 6] This is a view showing light absorption spectra of CNT separated according to a centrifugal method (Example 5, Laser-CNT, SC)

The photoabsorption spectral patterns of CNT separated according to a centrifugal method are shown in FIG. 6. The spectrum before separation, that of the gel fraction and that of the solution fraction are shown as shifted in the vertical axis direction.

As compared with the absorption by semiconducting CNT (S2) and the absorption by metallic CNT (M1) in the spectrum of the CNT dispersion before separation, the proportion of M1 of metallic CNT significantly increased in the spectrum of the solution fraction after separation. On the contrary, the proportion of the absorption by semiconducting CNT (S2) increased in the gel fraction.

The above results clearly show that in the case where SC is used, metallic CNT and semiconducting CNT can be separated and collected in an extremely simplified manner.

Example 6

A sample of Laser-CNT was treated according to a freezing squeezing method, and separated into metallic CNT and semiconducting CNT.

The process of this experiment was the same as in Example 1, except that freezing-thawing-squeezing and not centrifugation was applied to the sample in eluting metallic CNT from the CNT-containing gel, and that the agarose final concentration in the CNT-containing gel was 0.4%.

The detailed process of freezing-thawing-squeezing is as follows:

The prepared CNT-containing gel in a vessel was frozen as such at −20° C., then restored to room temperature and thawed. The thawed gel was taken in a wrap, and squeezed, and the resulting solution was collected to be a solution fraction, and the remaining solid ingredient was a gel fraction.

Figure 7:
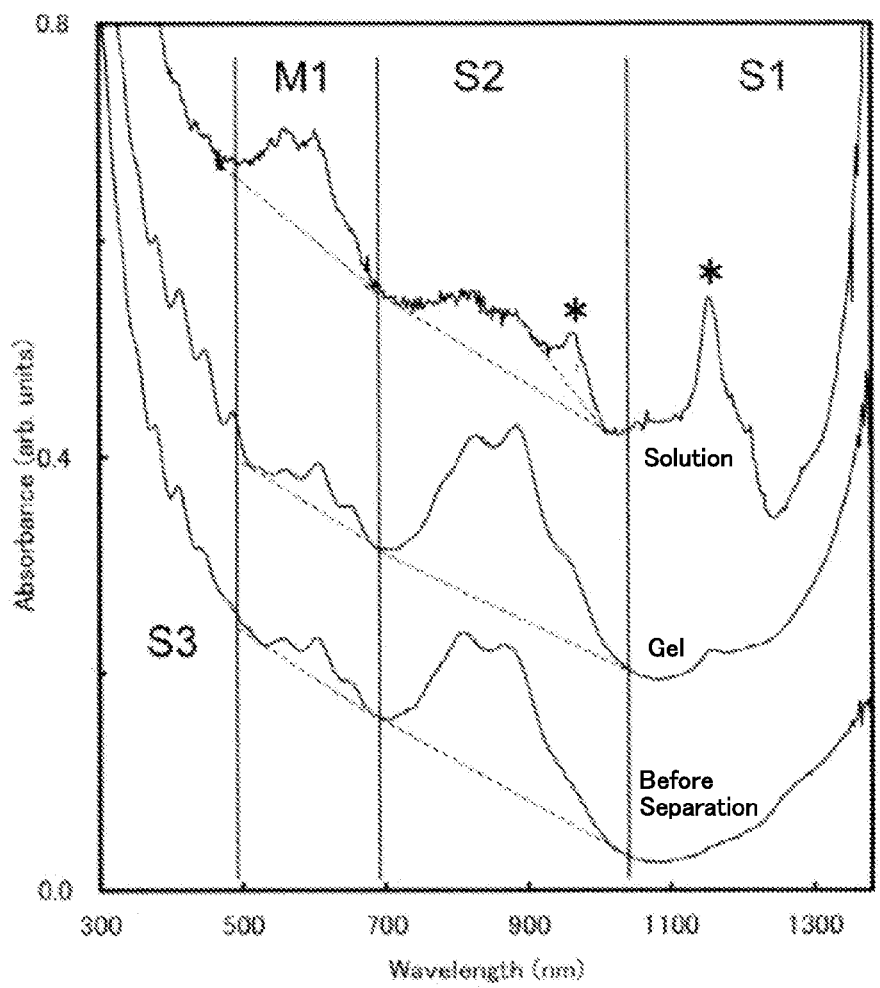
[FIG. 7] This is a view showing light absorption spectra of CNT separated according to a freezing squeezing method (Example 6, Laser-CNT, SDS).

The photoabsorption spectral patterns of CNT separated according to the freeze squeezing method are shown in FIG. 7. The spectrum before separation, that of the gel fraction and that of the solution fraction are shown as shifted in the vertical axis direction.

As compared with the absorption by semiconducting CNT (S2) and the absorption by metallic CNT (M1) in the spectrum of the CNT dispersion before separation, the proportion of M1 of metallic CNT significantly increased in the spectrum of the solution fraction after separation. On the contrary, the proportion of the absorption by semiconducting CNT (S2) increased in the gel fraction.

The above results clearly show that, by freezing-thawing-squeezing and not by centrifugation with a centrifuge, metallic CNT and semiconducting CNT can be separated and collected from the CNT-containing gel in an extremely simplified manner.

Example 7

According to a freezing squeezing method in which the gel concentration was varied, metallic CNT and semiconducting CNT were separated.

The process of this experiment was the same as in Example 6, except that the agarose final concentration (0.4%) in the CNT-containing gel was varied within a range of from 0.1 to 0.7%.

Figure 8:
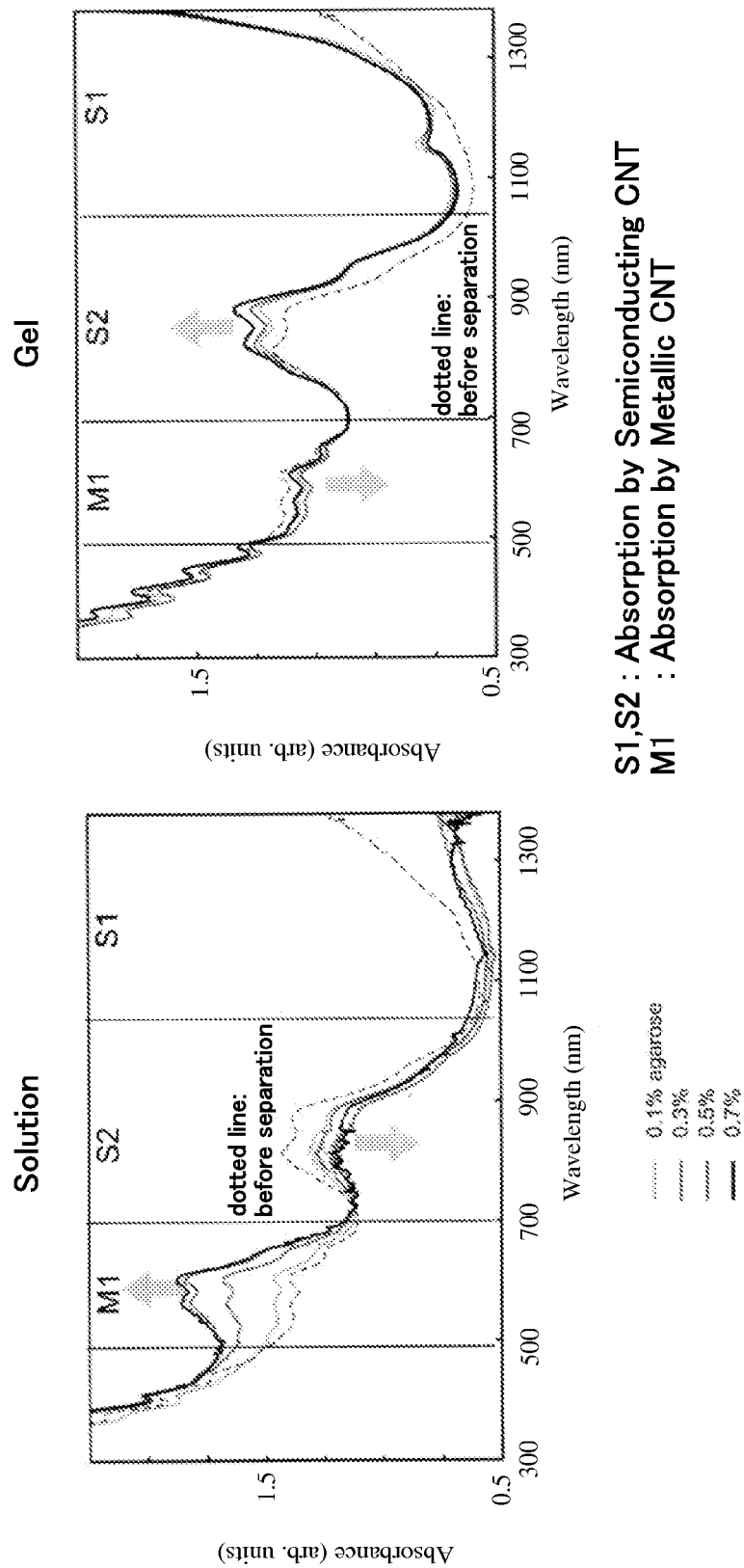
[FIG. 8] This is a view showing light absorption spectra of CNT separated according to a freezing squeezing method with changing the gel concentration (Example 7, Laser-CNT, SDS).

The photoabsorption spectral patterns of CNT separated according to a freezing squeezing method in which the gel concentration was varied are shown in FIG. 8. The patterns of the solution fraction are in the left-side graph; and the patterns of the gel fraction are in the right-side graph. In these, the spectral patterns given with a different gel concentration are shown as superimposed.

The patterns of the solution fraction are referred to. As compared with the spectrum of the CNT dispersion before separation (dotted line), the absorption by metallic CNT (M1) increased while the absorption by semiconducting CNT (S2) decreased, with the increase in the gel concentration. On the other hand, in the patterns of the gel fraction, the absorption by semiconducting CNT (S2) increased with the decrease in the gel concentration.

The above results show that also in a freezing squeezing method where the gel concentration is set suitably, metallic CNT and semiconducting CNT can be separated and collected at high purity.

Example 8

Metallic CNT and semiconducting CNT were separated through centrifugation in place of squeezing in the freezing squeezing method.
(Freezing Centrifugal Method)

The process of this experiment was the same as in Example 6, except that Hipco-CNT were used in place of Laser-CNT and that centrifugation was applied to the sample in place of the squeezing step after freezing-thawing.

The condition of centrifugation was 16,000×g, 3 hours and 25° C. On the way of the process, centrifugation was once stopped in 15 minutes after the start of centrifugation, and the supernatant was collected. The amount of the supernatant collected in this stage was the same as or more than that of the supernatant collected in 3 hours in the ordinary centrifugation method of directly centrifuging the CNT-containing gel not treated in the freezing-thawing step.

Figure 9:
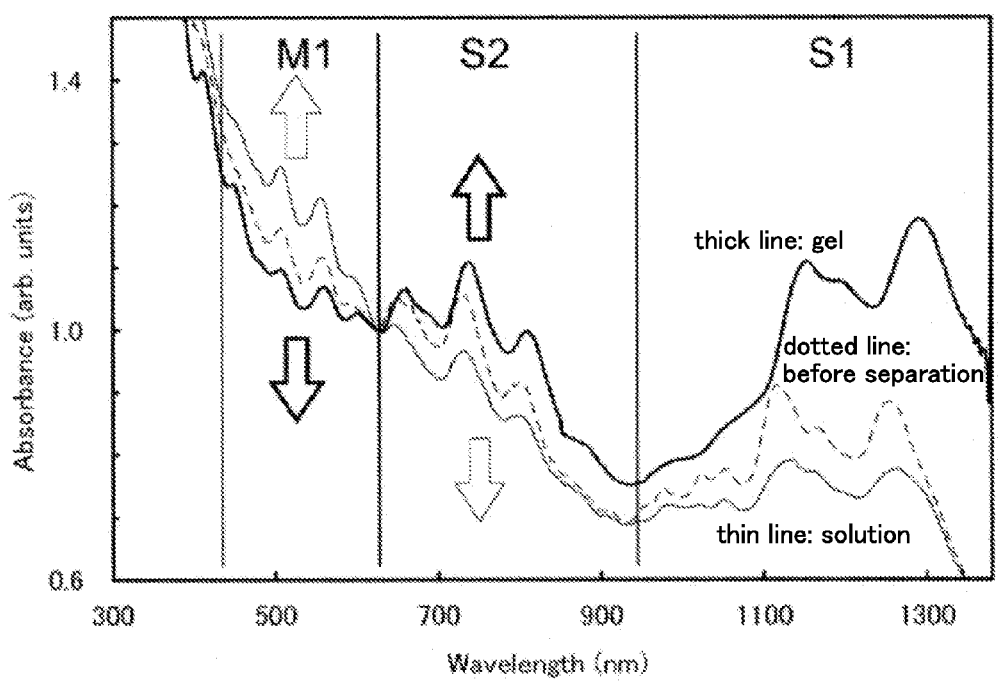
[FIG. 9] This is a view showing light absorption spectra of CNT separated according to a centrifugal method in place of the squeezing in a freezing squeezing method (Example 8, Hipco-CNT, SDS).

The photoabsorption spectral patterns of the solution fraction and the gel fraction separated through centrifugation in place of squeezing in the freezing squeezing method are shown in FIG. 9. In these, the spectral patterns are shown as superimposed.

As compared with the absorption by semiconducting CNT (S2) and the absorption by metallic CNT (M1) in the spectrum of the CNT dispersion before separation (dotted line), the proportion of M1 by metallic CNT increased in the spectrum of the solution fraction after separation (thin line). On the contrary, the proportion of the absorption by semiconducting CNT (S2) increased in the gel fraction after separation (thick line).

The above results show that, in the freezing squeezing method, the step of squeezing after freezing-thawing may be replaced with centrifugation. This process makes it possible to separate the gel and the solution within a shorter period of time than in the centrifugal method not including a freezing-thawing step, and the process has another advantage in that the loss of the solution to be collected may be reduced as compared with the case of squeezing by wrapping in the freezing squeezing method.

Example 9

A sample of Hipco-CNT was treated for metallic/semiconducting separation according to a diffusion method.

The process of this experiment was the same as in Example 6 up tot eh preparation of the CNT-containing gel. In this, however, Hipco-CNT were used in place of Laser-CNT and the agarose final concentration was 0.4%.

In Example 1, the CNT-containing gel was prepared in a microtube; however in this, the gel was solidified in a glass tube having an inner diameter of 2.5 mm. The solidified CNT-containing gel was taken out of the glass tube, cut into pieces of 3 mm long or so. Here such small gels were used, and therefore the surface area of the gels was increased and CNT inside the gel could be more easily diffused out of the gel.

An eluent (1% SDS-containing TB buffer) was added to the small, CNT-containing gel pieces of around 0.4 ml each, and left as such for about 15 hours, whereby CNT in the CNT-containing gel were eluted out. The eluate was collected not crushing the gel pieces, and this is a solution fraction. The gel was washed with 1% SDS-containing TB buffer, and was collected as a gel fraction. Afterwards, these were analyzed for photoabsorption spectrometry like in Example 1.

Figure 10:
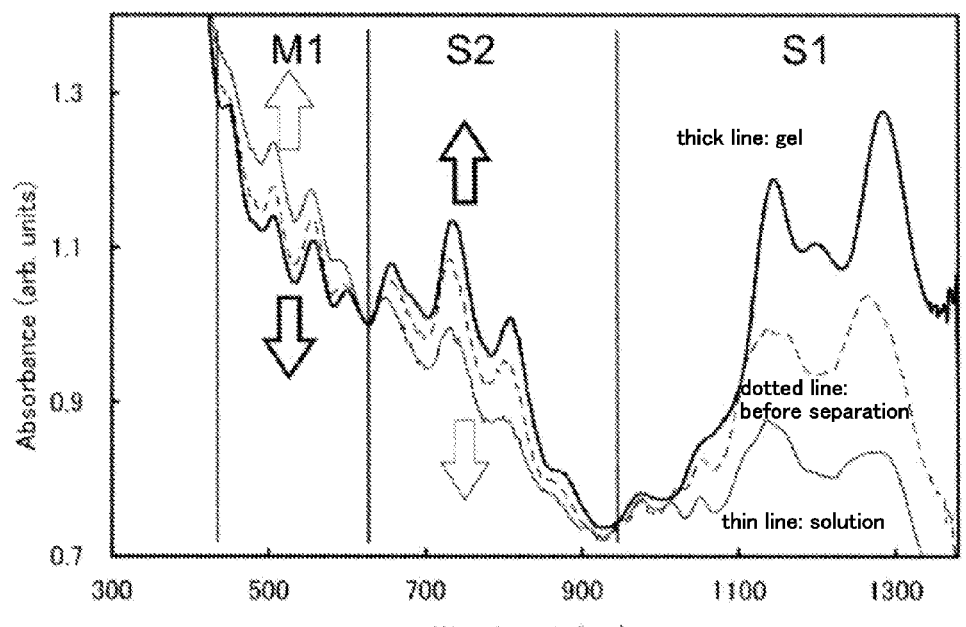
[FIG. 10] This is a view showing light absorption spectra of CNT separated according to an elution method (Example 9, Hipco-CNT, SDS).

The photoabsorption spectral pattern of CNT separated according to the elution method are shown in FIG. 10. The spectral patterns are shown as superimposed.

As compared with the absorption by semiconducting CNT (S2) and the absorption by metallic CNT (M1) in the spectrum of the CNT dispersion before elution (dotted line), the proportion of M1 by metallic CNT increased in the spectrum of the solution fraction after elution (thin line). On the contrary, the proportion of the absorption by semiconducting CNT (S2) increased in the gel fraction after elution (thick line).

The above results show that metallic/semiconducting CNT can be separated in an extremely simplified method of merely dipping a CNT-containing gel in a solution, not requiring centrifugation or freezing-squeezing.

Example 10

A sample of Hipco-CNT was treated according to a permeation method for separating it into metallic CNT and semiconducting CNT. In this, the CNT-containing gel obtained therein was treated according to a centrifugal method, and metallic CNT and semiconducting CNT having a higher purity were separated.

An agarose gel not containing CNT was dipped in a CNT dispersion to prepare a CNT-containing gel. The gel was completely dissolved in a TB buffer containing 0.4% agarose and 2% SDS, using a microwave oven, and this was solidified in a glass tube having an inner diameter of 2.5 mm. The solidified gel was taken out of the glass tube, and cut into small pieces of around 3 mm long each. Here such small gels were used, and therefore the surface area of the gels was increased and CNT could be fully permeated into the inside of the gels. A CNT dispersion (0.4 ml) prepared in the same manner as in Example 1 but using Hipco-CNT in place of Laser-CNT was added to the small gel pieces of around 0.4 ml each, and left as such for about 15 hours, whereby CNT were permeated into the gel. The solution was collected not crushing the gel pieces, and this is a solution fraction. The gel was washed with 2% SDS-containing TB buffer, and was collected as a gel fraction. Afterwards, these were analyzed for photoabsorption spectrometry like in Example 1. The patterns are shown in FIG. 11 (left side).

Before separation (dipping), the spectrum of the gel fraction and that of the solution fraction are shown as superimposed. As compared with the absorption by semiconducting CNT (S2) and the absorption by metallic CNT (M1) in the spectrum of the CNT dispersion before dipping (dotted line), the proportion of M1 by metallic CNT increased in the spectrum of the solution fraction after dipping (thin line). On the contrary, the proportion of the absorption by semiconducting CNT (S2) increased in the gel fraction after dipping (thick line).

The above results show that metallic/semiconducting CNT can be separated in an extremely simplified method of merely dipping a gel in a CNT dispersion, not requiring centrifugation or freezing-squeezing.

Figure 11:
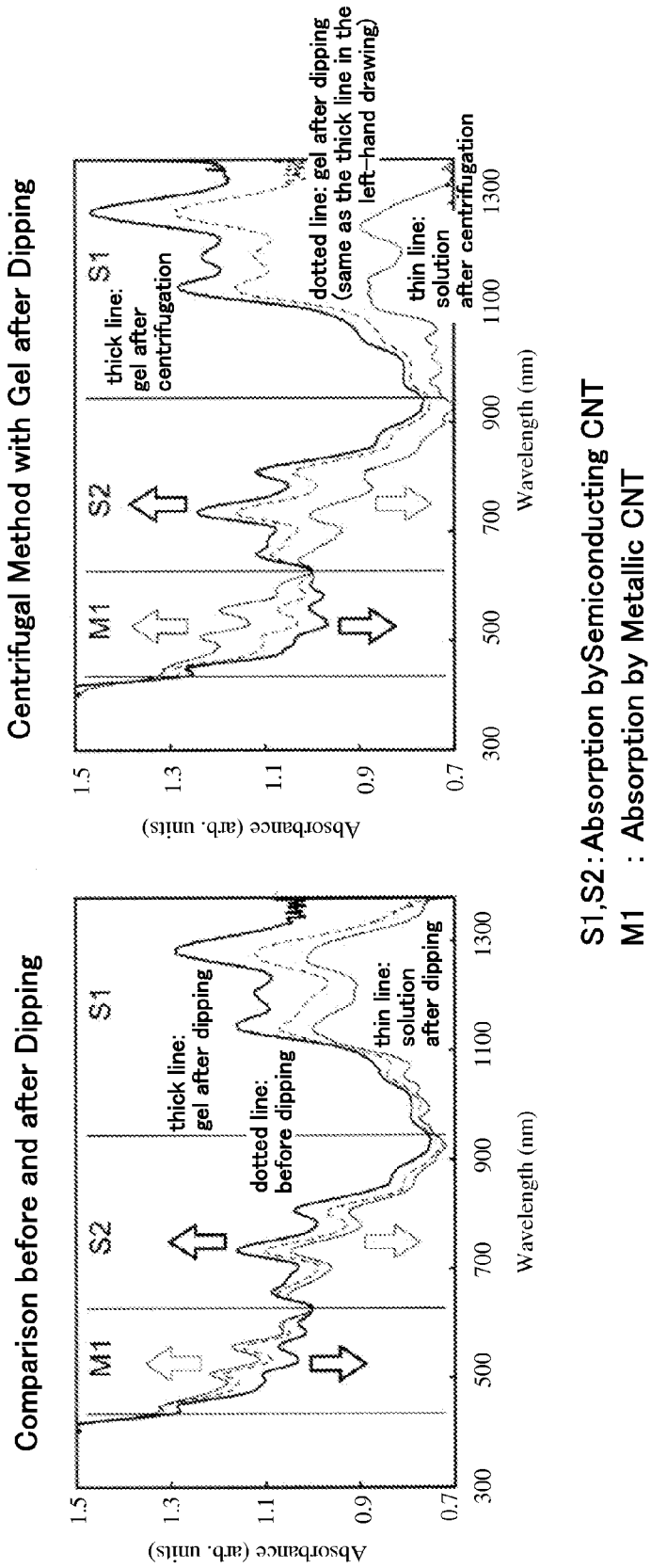
[FIG. 11] The left side is a view showing light absorption spectra of CNT separated according to a permeation method (Example 10, Hipco-CNT, SDS). The right side is a view showing light absorption spectra of CNT separated according to a centrifugal method from a CNT-containing gel obtained in a dipping method (Example 10, Hipco-CNT, SDS).

The gel (CNT-containing gel) after dipping was treated according to a centrifugal method (16,000×g, 3 hours, 25° C.) for separation, and the results are shown in FIG. 11 (right side). As compared with the absorption by semiconducting CNT (S2) and the absorption by metallic CNT (M1) in the spectrum before separation (gel after dipping) (dotted line), the proportion of M1 by metallic CNT increased in the spectrum of the solution fraction after centrifugation (thin line). On the contrary, the proportion of the absorption by semiconducting CNT (S2) increased in the gel fraction after centrifugation (thick line).

The above results show the possibility metallic/semiconducting CNT separation according to a centrifugal method from a CNT-containing gel prepared by dipping. The CNT-containing gel prepared by mixing a dissolved gel and a CNT dispersion followed by cooling it contains impurities (bundles, etc.) that could not be separated from the gel through centrifugation, while on the other hand, the CNT-containing gel prepared according to a dipping method does not contain any other capable of permeating into the gel, and therefore, the latter gel has the advantage in that the purity of the semiconducting CNT in the gel fraction after centrifugation is high.

Example 11

A sample of Arc-CNT (by Meijo Nanocarbon, CNT produced according to an arc discharging method, having a diameter of 1.4±0.1 nm) was treated according to a centrifugal method for separation into metallic CNT and semiconducting CNT.

Figure 12:
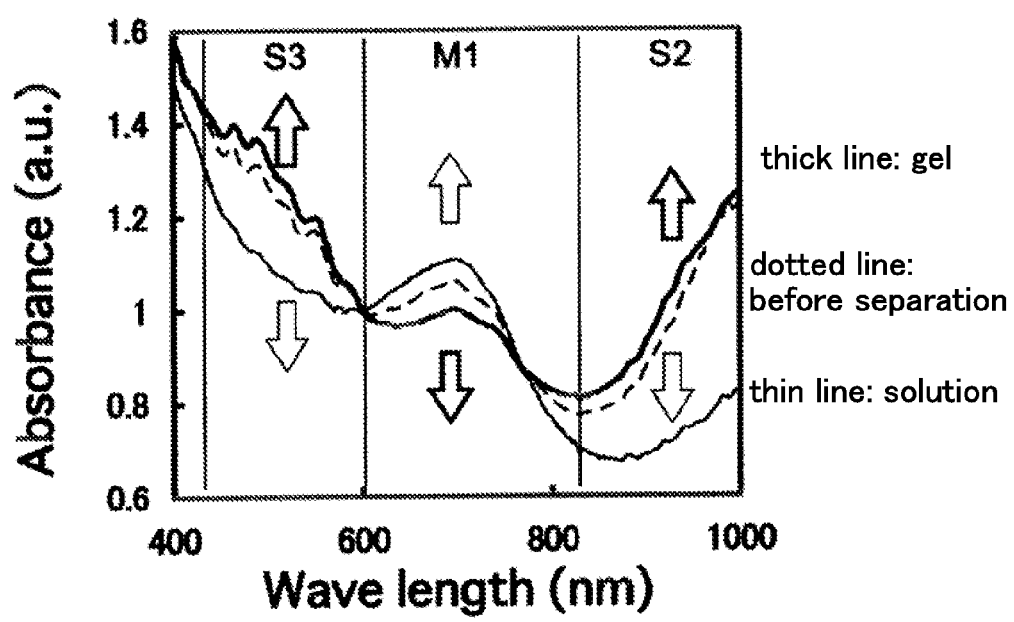
[FIG. 12] This is a view showing light absorption spectra of CNT separated according to a centrifugal method (Example 11, Arc-CNT, SOS).

The process of this experiment was the same as in Example 1, except that Arc-CNT were used in place of Laser-CNT and that the agarose final concentration was 0.4%. The results are shown in FIG. 12. The spectral patterns are shown as superimposed.

The pattern of the solution fraction (thin line) is referred to. As compared with the spectrum of the CNT dispersion before separation (dotted line), the absorption by metallic CNT (M1) increased relative to the absorption by semiconducting CNT (S2, S3). On the contrary, the absorption by metallic CNT (M1) decreased relative to the absorption by semiconducting CNT (S2, S3) in the gel fraction (thick line).

The above results show that metallic CNT and semiconducting CNT can be separated in an extremely simplified manner not only from Laser-CNT but also from Arc-CNT.

Example 12

A sample of Arc-CNT was treated according to a centrifugal method using a surfactant of sodium dodecanesulfonate for metallic/semiconducting separation.

Figure 13:
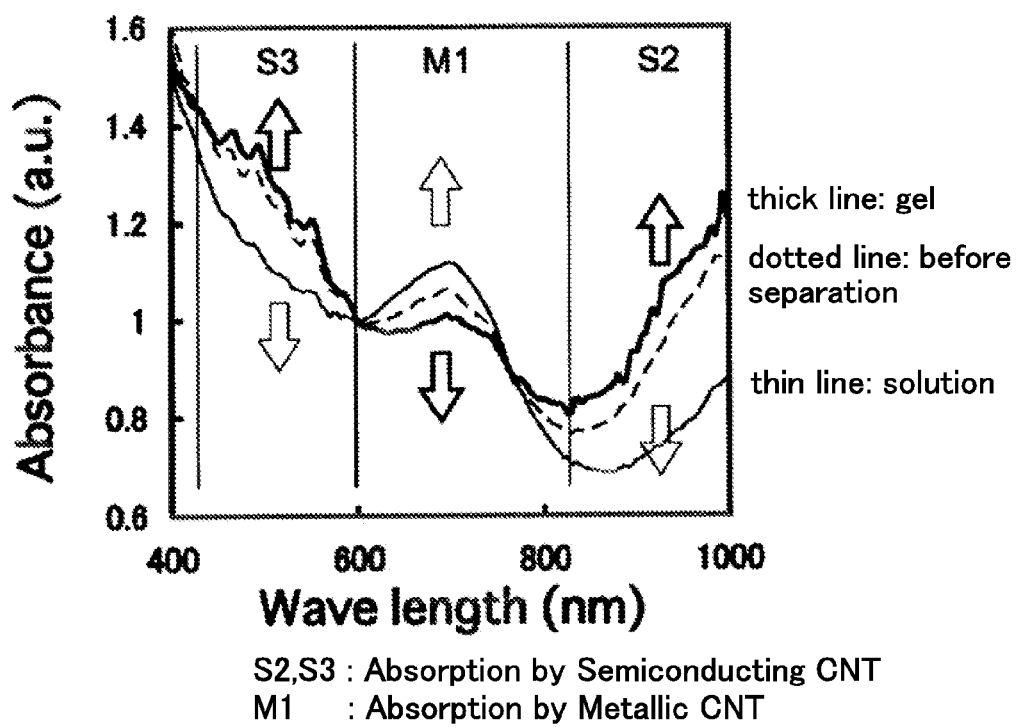
[FIG. 13] This is a view showing light absorption spectra of CNT separated according to a centrifugal method (Example 12, Arc-CNT, sodium dodecanesulfonate).

The process of this experiment was the same as in Example 11, except that sodium dodecanesulfonate was used as the surfactant in place of SDS. The results are shown in FIG. 13. The spectral patterns are shown as superimposed.

The pattern of the solution fraction (thin line) is referred to. As compared with the spectrum of the CNT dispersion before separation (dotted line), the absorption by metallic CNT (M1) increased relative to the absorption by semiconducting CNT (S2, S3). On the contrary, the absorption by metallic CNT (M1) decreased relative to the absorption by semiconducting CNT (S2, S3) in the gel fraction (thick line).

The above results show that metallic CNT and semiconducting CNT can be separated in an extremely simplified manner using sodium dodecanesulfonate as the surfactant.

Example 13

A sample of Arc-CNT was treated according to a centrifugal method using a surfactant of sodium decyl sulfate for metallic/semiconducting separation.

Figure 14:
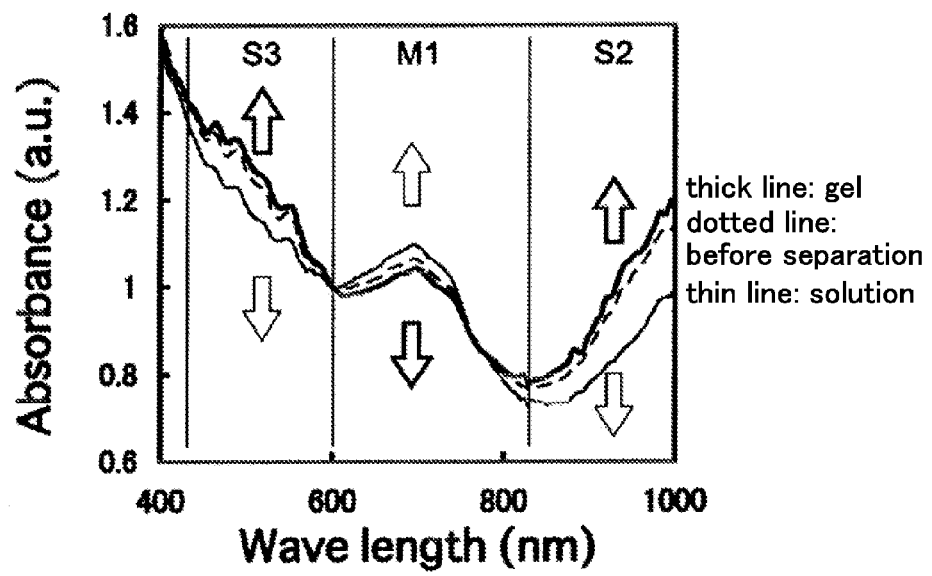
[FIG. 14] This is a view showing light absorption spectra of CNT separated according to a centrifugal method (Example 13, Arc-CNT, sodium decyl sulfate).

The process of this experiment was the same as in Example 11, except that sodium decyl sulfate (final concentration 0.5%) was used as the surfactant in place of SDS. The results are shown in FIG. 14. The spectral patterns are shown as superimposed.

The pattern of the solution fraction (thin line) is referred to. As compared with the spectrum of the CNT dispersion before separation (dotted line), the absorption by metallic CNT (M1) increased relative to the absorption by semiconducting CNT (S2, S3). On the contrary, the absorption by metallic CNT (M1) decreased relative to the absorption by semiconducting CNT (S2, S3) in the gel fraction (thick line).

The above results show that metallic CNT and semiconducting CNT can be separated in an extremely simplified manner using sodium decyl sulfate as the surfactant.

Example 14

A sample of Arc-CNT was treated according to a centrifugal method using a surfactant of sodium tetradecyl sulfate for metallic/semiconducting separation.

Figure 15:
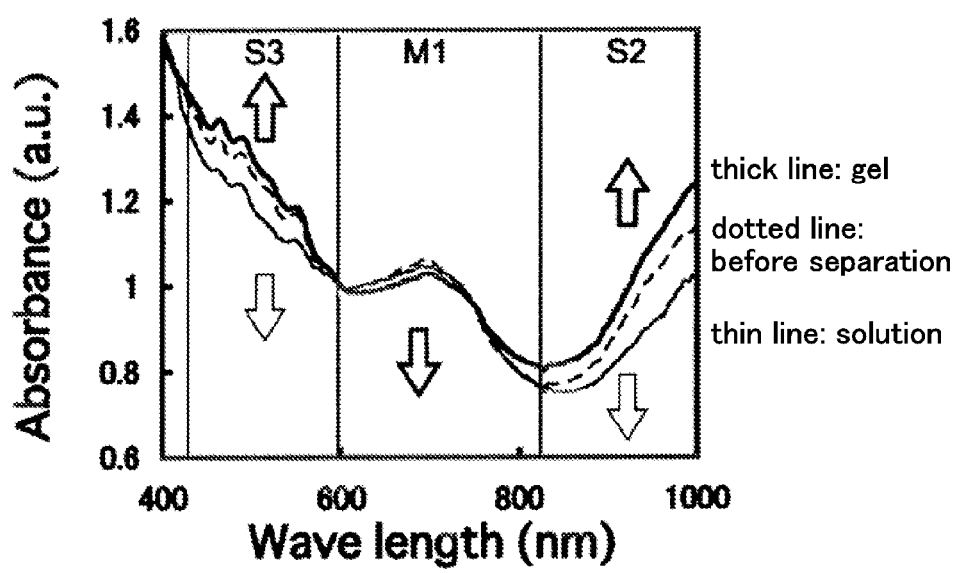
[FIG. 15] This is a view showing light absorption spectra of CNT separated according to a centrifugal method (Example 14, Arc-CNT, sodium tetradecyl sulfate).

The process of this experiment was the same as in Example 11, except that sodium tetradecyl sulfate was used as the surfactant in place of SDS. The results are shown in FIG. 15. The spectral patterns are shown as superimposed.

The pattern of the solution fraction (thin line) is referred to. As compared with the spectrum of the CNT dispersion before separation (dotted line), the absorption by metallic CNT (M1) increased relative to the absorption by semiconducting CNT (S2, S3). On the contrary, the absorption by metallic CNT (M1) decreased relative to the absorption by semiconducting CNT (S2, S3) in the gel fraction (thick line).

The above results show that metallic CNT and semiconducting CNT can be separated in an extremely simplified manner using sodium tetradecyl sulfate as the surfactant.

Example 15

A sample of Arc-CNT was treated according to a centrifugal method using a surfactant of sodium dodecanoyl sarcosine for metallic/semiconducting separation.

Figure 16:
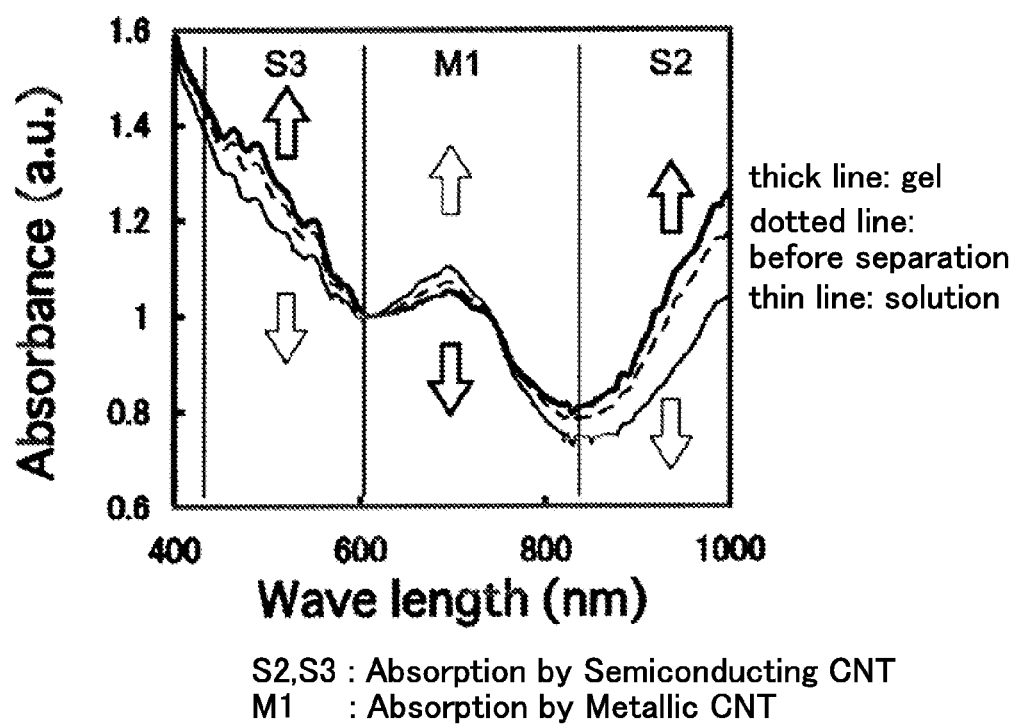
[FIG. 16] This is a view showing light absorption spectra of CNT separated according to a centrifugal method (Example 15, Arc-CNT, sodium dodecanoyl sarcosine).

The process of this experiment was the same as in Example 11, except that sodium dodecanoyl sarcosine was used as the surfactant in place of SDS. The results are shown in FIG. 16. The spectral patterns are shown as superimposed.

The pattern of the solution fraction (thin line) is referred to. As compared with the spectrum of the CNT dispersion before separation (dotted line), the absorption by metallic CNT (M1) increased relative to the absorption by semiconducting CNT (S2, S3). On the contrary, the absorption by metallic CNT (M1) decreased relative to the absorption by semiconducting CNT (S2, S3) in the gel fraction (thick line).

The above results show that metallic CNT and semiconducting CNT can be separated in an extremely simplified manner using sodium dodecanoyl sarcosine as the surfactant.

Example 16

A sample of Arc-CNT was treated according to a centrifugal method using a surfactant of sodium dodecanoate for metallic/semiconducting separation.

Figure 17:
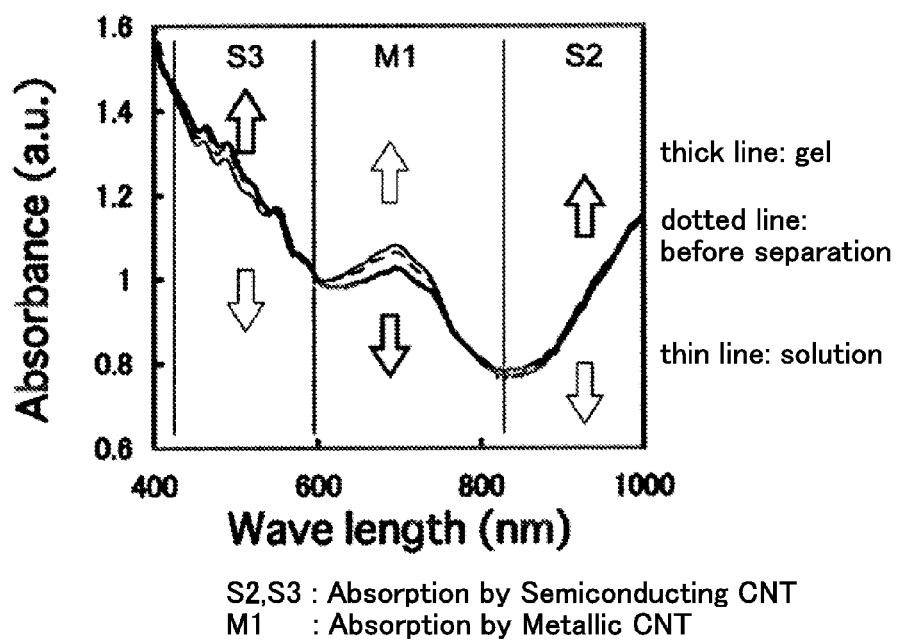
[FIG. 17] This is a view showing light absorption spectra of CNT separated according to a centrifugal method (Example 16, Arc-CNT, sodium dodecanoate).

The process of this experiment was the same as in Example 11, except that sodium dodecanoate (final concentration 0.5%) was used as the surfactant in place of SDS. The results are shown in FIG. 17. The spectral patterns are shown as superimposed.

The pattern of the solution fraction (thin line) is referred to. As compared with the spectrum of the CNT dispersion before separation (dotted line), the absorption by metallic CNT (M1) increased relative to the absorption by semiconducting CNT (S2, S3). On the contrary, the absorption by metallic CNT (M1) decreased relative to the absorption by semiconducting CNT (S2, S3) in the gel fraction (thick line).

The above results show that metallic CNT and semiconducting CNT can be separated in an extremely simplified manner using sodium dodecanoate as the surfactant.

Example 17

A sample of Arc-CNT was treated according to a centrifugal method using a surfactant of n-dodecylphosphocholine for metallic/semiconducting separation.

Figure 18:
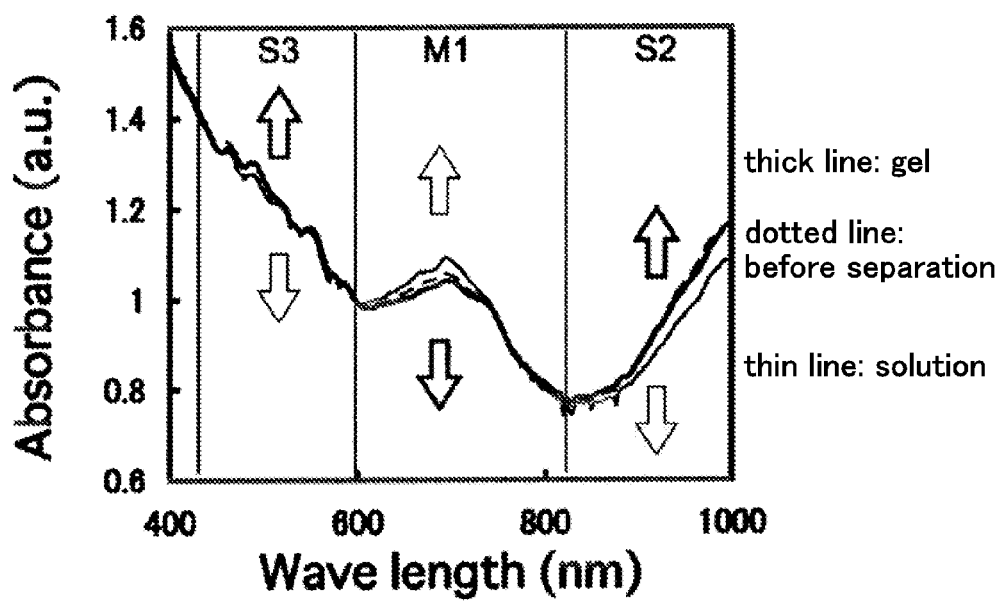
[FIG. 18] This is a view showing light absorption spectra of CNT separated according to a centrifugal method (Example 17, Arc-CNT, n-dodecylphosphocholine).

The process of this experiment was the same as in Example 11, except that n-dodecylphosphocholine was used as the surfactant in place of SDS. The results are shown in FIG. 18. The spectral patterns are shown as superimposed.

The pattern of the solution fraction (thin line) is referred to. As compared with the spectrum of the CNT dispersion before separation (dotted line), the absorption by metallic CNT (M1) increased relative to the absorption by semiconducting CNT (S2, S3). On the contrary, the absorption by metallic CNT (M1) decreased relative to the absorption by semiconducting CNT (S2, S3) in the gel fraction (thick line).

The above results show that metallic CNT and semiconducting CNT can be separated in an extremely simplified manner using n-dodecylphosphocholine as the surfactant.

The invention claimed is:

1. A method for separating metallic carbon nanotubes and semiconducting carbon nanotubes, comprising:
   centrifuging a carbon nanotubes-containing gel containing the metallic carbon nanotubes and the semiconducting carbon nanotubes and thereby separating the carbon nanotubes-containing gel into:
   a solution containing the metallic carbon nanotubes, and
   a gel containing the semiconducting carbon nanotubes.

2. The method for separating metallic carbon nanotubes and semiconducting carbon nanotubes of claim 1, further comprising:
   preparing a carbon nanotube dispersion by ultrasonically treating a solution containing metallic carbon nanotubes, semiconducting carbon nanotubes, and a surfactant; and
   preparing the carbon nanotubes-containing gel by introducing the carbon nanotube dispersion in a gel.

3. The method for separating metallic carbon nanotubes and semiconducting carbon nanotubes of claim 2, wherein the surfactant is an anionic surfactant or an amphoteric surfactant.

4. The method for separating metallic carbon nanotubes and semiconducting carbon nanotubes of claim 3, wherein the anionic surfactant is alkyl sulfate, sodium dodecanesulfonate, sodium dodecanoyl sarcosine, sodium dodecanoate, or sodium cholate.

5. The method for separating metallic carbon nanotubes and semiconducting carbon nanotubes of claim 4, wherein the alkyl sulfate is sodium dodecyl sulfate, sodium decyl sulfate, or sodium tetradecyl sulfate.

6. The method for separating metallic carbon nanotubes and semiconducting carbon nanotubes of claim 3, wherein the amphoteric surfactant is n-dodecylphosphocoline.

7. The method for separating metallic carbon nanotubes and semiconducting carbon nanotubes of claim 1, further comprising successive freezing and thawing of the carbon nanotubes-containing gel before centrifuging the carbon nanotubes-containing gel.

8. A method for separating metallic carbon nanotubes and semiconducting carbon nanotubes, comprising:
    freezing a carbon nanotubes-containing gel containing the metallic carbon nanotubes and the semiconducting carbon nanotubes,
    thawing the frozen carbon nanotubes-containing gel, and
    squeezing the thawed, carbon nanotubes-containing gel to thereby separate it into a solution containing the metallic carbon nanotubes and a gel containing the semiconducting carbon nanotubes.

9. The method for separating metallic carbon nanotubes and semiconducting carbon nanotubes of claim 8, further comprising:
    preparing a carbon nanotube dispersion by ultrasonically treating a solution containing metallic carbon nanotubes, semiconducting carbon nanotubes, and a surfactant; and
    preparing the carbon nanotubes-containing gel by introducing the carbon nanotube dispersion in a gel.

10. The method for separating metallic carbon nanotubes and semiconducting carbon nanotubes of claim 9, wherein the surfactant is an anionic surfactant or an amphoteric surfactant.

11. The method for separating metallic carbon nanotubes and semiconducting carbon nanotubes of claim 10, wherein the anionic surfactant is alkyl sulfate, sodium dodecanesulfonate, sodium dodecanoyl sarcosine, sodium dodecanoate, or sodium cholate.

12. The method for separating metallic carbon nanotubes and semiconducting carbon nanotubes of claim 11, wherein the alkyl sulfate is sodium dodecyl sulfate, sodium decyl sulfate, or sodium tetradecyl sulfate.

13. The method for separating metallic carbon nanotubes and semiconducting carbon nanotubes of claim 10, wherein the amphoteric surfactant is n-dodecylphosphocoline.

14. A method for separating metallic carbon nanotubes and semiconducting carbon nanotubes, comprising:
    immersing a carbon nanotubes-containing gel containing the metallic carbon nanotubes and the semiconducting carbon nanotubes in a solution to diffuse and elute the metallic carbon nanotubes contained in the carbon nanotubes-containing gel into the solution; and
    separating the solution into which the metallic carbon nanotubes have eluted from the carbon nanotubes-containing gel containing the semiconducting carbon nanotubes.

15. The method for separating metallic carbon nanotubes and semiconducting carbon nanotubes of claim 14, further comprising:
    preparing a carbon nanotube dispersion by ultrasonically treating a solution containing metallic carbon nanotubes, semiconducting carbon nanotubes, and a surfactant, and
    preparing the carbon nanotubes-containing gel by introducing the carbon nanotube dispersion in a gel.

16. The method for separating metallic carbon nanotubes and semiconducting carbon nanotubes of claim 15, wherein the surfactant is an anionic surfactant or an amphoteric surfactant.

17. The method for separating metallic carbon nanotubes and semiconducting carbon nanotubes of claim 16, wherein the anionic surfactant is alkyl sulfate, sodium dodecanesulfonate, sodium dodecanoyl sarcosine, sodium dodecanoate, or sodium cholate.

18. The method for separating metallic carbon nanotubes and semiconducting carbon nanotubes of claim 17, wherein the alkyl sulfate is sodium dodecyl sulfate, sodium decyl sulfate, or sodium tetradecyl sulfate.

19. The method for separating metallic carbon nanotubes and semiconducting carbon nanotubes of claim 16, wherein the amphoteric surfactant is n-dodecylphosphocoline.

20. The method for separating metallic carbon nanotubes and semiconducting carbon nanotubes of claim 14, further comprising successive freezing and thawing of the carbon nanotubes-containing gel before immersing the carbon nanotubes-containing gel in the solution.

* * * * *